United States Patent
Russell et al.

(10) Patent No.: US 11,136,147 B2
(45) Date of Patent: Oct. 5, 2021

(54) ORIENTED WIRE ELECTROSTATIC RADIATION PROTECTION SYSTEM AND METHOD FOR SPACECRAFT

(71) Applicant: The Boeing Company, Chicago, IL (US)

(72) Inventors: James C. Russell, Bellevue, WA (US); Landon K. Henson, Snoqualmie, WA (US)

(73) Assignee: The Boeing Company, Chicago, IL (US)

( * ) Notice: Subject to any disclaimer, the term of this patent is extended or adjusted under 35 U.S.C. 154(b) by 587 days.

(21) Appl. No.: 16/141,933

(22) Filed: Sep. 25, 2018

(65) Prior Publication Data

US 2020/0094995 A1    Mar. 26, 2020

(51) Int. Cl.
*B64G 1/54*    (2006.01)
(52) U.S. Cl.
CPC ...................... *B64G 1/54* (2013.01)
(58) Field of Classification Search
CPC .... B64G 1/54; B64G 2001/1064; B64G 1/12; B64G 9/00; B64G 1/222
See application file for complete search history.

(56) References Cited

U.S. PATENT DOCUMENTS

| 8,740,154 B2 * | 6/2014 | Bamford | B64G 1/54 244/171.7 |
|---|---|---|---|
| 10,583,939 B2 * | 3/2020 | Williams | B64G 1/543 |
| 2006/0169489 A1 * | 8/2006 | Kinstler | B64G 1/54 174/350 |
| 2009/0084903 A1 | 4/2009 | Kinstler | |

OTHER PUBLICATIONS

Wikipedia Article on Electric Sail, 5 web pages, from website web address at https://en.wikipedia.org/wiki/Electric_sail, as of Sep. 25, 2018.

* cited by examiner

*Primary Examiner* — Brian M O'Hara
*Assistant Examiner* — Keith L Dixon

(57) ABSTRACT

There is provided an oriented wire electrostatic radiation protection system for a spacecraft. The system has a wire management system, and first and second wires coupled to the wire management system. A first wire orientation apparatus orients the first wire in a first wire direction toward, and in parallel alignment with, an approach path of approaching solar particles. A second wire orientation apparatus orients the second wire in a second wire direction opposite to the first wire direction. The system has a control system, and a power supply to charge the first wire to a positively-charged wire and to charge the second wire to a negatively-charged wire. When the approaching solar particles travel alongside the positively-charged wire toward the spacecraft, the positively-charged wire deflects the approaching solar particles away from the spacecraft, via electrostatic repulsion, and the positively-charged wire creates a radiation protection shielded region around the spacecraft.

20 Claims, 9 Drawing Sheets

| SPACECRAFT 12 | INTERPLANETARY SPACECRAFT 12a | MANNED SPACECRAFT 12b |
|---|---|---|
| UNMANNED SPACECRAFT 12c | PORTION 12d | SOLAR PARTICLE DETECTOR DEVICE(S) 50 |
| SPACECRAFT OCCUPANT(S) 20 | SPACECRAFT EQUIPMENT 22 | SPACECRAFT POSITION 52 |

ORIENTED WIRE ELECTROSTATIC RADIATION PROTECTION SYSTEM(S) 10

| FIRST WIRE 56 | POSITIVELY-CHARGED WIRE 56a | PROTECTION ELECTRODE 56b |
|---|---|---|
| LENGTH 58 | DIAMETER 59 | TENSION 106 | FIRST WIRE TENSION 106a |

| FW STOWED POSITION 74 | FW SPOOLED POS. 74a | FW EXTENDED POS. 76 | FW UNSPOOLED POS. 76a |

| SECOND WIRE 60 | LENGTH 62 | DIAMETER 63 | SECOND WIRE TENSION 106b |
| NEGATIVELY-CHARGED WIRE 60a | COUNTER-ELECTRODE 60b | CHARGE BALANCE 51 |

| SW STOWED POSITION 75 | SW SPOOLED POS. 75a | SW EXTENDED POS. 77 | SW UNSPOOLED POS. 77a |

| MULTI-STRAND WIRE 64 | BONDED PORTIONS 65 | CONDUCTIVE METAL MATERIAL(S) 90 |

| WIRE MANAGEMENT SYSTEM 54 | WIRE MANAGEMENT ASSEMBLY(IES) 55 | MOTOR(S) 80 |
| SPOOLING APPARATUS 72 | SPOOL 73 | DEPLOYMENT APP. 78 | LAUNCH DEVICE 79 |

| WIRE ORIENTATION APP. (WOA) 66 | FIRST WOA 66a | SECOND WOA 66b | MICROSATELLITE 67 |
| ORIENTATION 98 | FIRST WIRE ORIENT. 98a | SECOND WIRE ORIENT. 98b |
| DIRECTION 100 | FIRST WIRE DIR. 100a | SECOND WIRE DIR. 100b | PARALLEL ALIGNMT. 102 |
| PREDETERMINED DISTANCE (PD) 104 | FIRST WIRE PD 104a | SECOND WIRE PD 104b |

| POWER SUPPLY (PS) 68 | PS FIRST POR. 68a | POS. TERM. 69a | PS SEC. POR. 68b | NEG. TERM. 69b |
| | GROUND TERM. 69c | HIGH VOLTAGE PS 68c |

| CONTROL SYSTEM 70 | CONTROLLER 82 | CONTROL INTERFACE 84 |
| ELECTROSTATIC REPULSION 108 | RADIATION PROTECTION SHIELDED REGION 110 |
| EFFICIENT DEFLECTION 114 | DEFLECTION VOLTAGE 116 | TIME-INTEGRATED LATERAL THRUST 112 |

| SOLAR SOURCE 30 | SUN 30a | SOLAR WIND 32 | SOLAR PARTICLE EVENT 34 | SOLAR CME 36 |
| SOLAR FLARE 38 | SOLAR PARTICLES (SP) 24 | APPROACHING SP 24a | HIGH ENERGY SP 24b |
| APPROACH PATH 28 | SOLAR PARTICLE RADIATION 26 | ANGLE 118 |
| CHARGED PARTICLES 40 | PROTONS 42 | POSITIVELY-CHARGED PROTONS 42a |
| ELECTRONS 44 | NEGATIVELY-CHARGED ELECTRONS 44a | HEAVY IONS 46 | NEUTRONS 48 |
| INTERPLANETARY SPACE TRAVEL 14 | SPACE 16 | PLANETS 18 | EARTH 18a | MARS 18b |
| GROUND-BASED INSTALLATION(S) 13 | GROUND-BASED INSTALLATION OCCUPANT(S) 21 |

FIG. 1

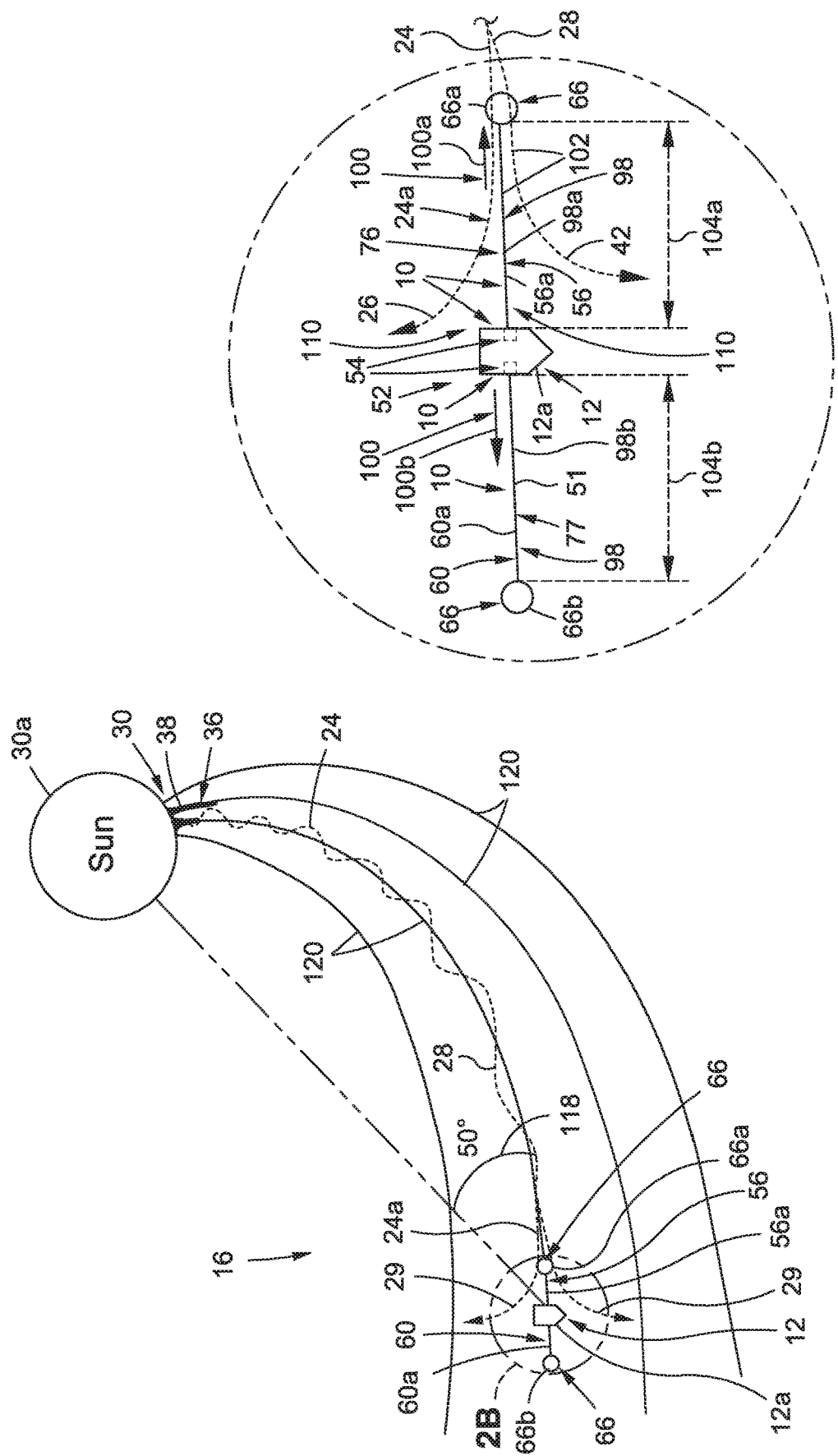

ORIENTED WIRE ELECTROSTATIC RADIATION PROTECTION SYSTEM AND METHOD FOR SPACECRAFT

BACKGROUND

1) Field of the Disclosure

The disclosure relates generally to radiation protection systems and methods for spacecraft, and more particularly, to an oriented wire electrostatic radiation protection system and method for spacecraft engaged in interplanetary space travel, for example, between Earth and Mars.

2) Description of Related Art

Interplanetary space travel involves travel by spacecraft between planets within a single planetary system. During interplanetary space travel from Earth, spacecraft leave the protection of Earth's magnetic field and risk exposure to large amounts of solar particle radiation, such as high energy charged solar particles, that may be released during a solar wind or a solar particle event, for example, a randomly-occurring solar coronal mass ejection ("CME") associated with solar flares on the Sun. Without effective solar particle radiation protection against a solar wind or a solar particle event, such as a solar CME, venturing beyond the Earth's protective magnetic field may pose significant risks to spacecraft occupants and spacecraft equipment, making interplanetary space travel, including to and from Mars, impractical.

Physical barriers or solar particle radiation absorbers for spacecraft may absorb solar particle radiation released by a solar wind or a solar particle event, such as a solar CME. Solar particle radiation absorbing materials of a thickness sufficient for the amount of energy expected from the solar particle radiation may be provided around the spacecraft or around an area of the spacecraft that houses spacecraft occupants and spacecraft equipment sensitive to solar particle radiation, during a solar wind or solar CME. However, the mass of such physical barrier or solar particle radiation absorbing material that may be needed to defeat a large flux of high energy charged solar particles released by a solar wind or solar CME may exceed 40 g/cm$^2$, (forty grams per square centimeter), amounting to hundreds of kilograms over the needed surface area. Thus, because of the significant amount of mass such a physical barrier or radiation absorbing material may require, the use of such physical barrier or solar particle radiation absorbing material is not practical for interplanetary space travel.

In addition, hydrogen and water may be effective solar particle radiation absorbers or shields. Interplanetary spacecraft may be designed with a small capsule or contained area deep inside a fuel tank or a water tank within the interplanetary spacecraft, in which spacecraft occupants may seek refuge during a solar wind or solar particle event, such as a solar CME. However, the spacecraft occupants would need to stay in the small capsule or contained area for the duration of the solar wind or solar particle event, such as the solar CME, which may last several days. Thus, this approach may prevent normal operation of the spacecraft by the spacecraft occupants during the solar wind or solar particle event, such as the solar CME, as the spacecraft occupants are confined within the small capsule or contained area.

Accordingly, there is a need in the art for a system and method to provide effective solar particle radiation protection to spacecraft occupants and spacecraft equipment in spacecraft, such as interplanetary spacecraft, that has lower mass than known barrier systems and methods, and uses less power and energy in operation than known electrostatic or electromagnetic systems and methods, and costs less to manufacture than known systems and methods.

SUMMARY

Example implementations of this disclosure provide for an oriented wire electrostatic radiation protection system and method for spacecraft, such as interplanetary spacecraft, that provide effective solar particle radiation protection. As discussed in the below detailed description, versions of the oriented wire electrostatic radiation protection system and method for spacecraft may provide significant advantages over known systems and methods.

In one version there is provided an oriented wire electrostatic radiation protection system for a spacecraft. The oriented wire electrostatic radiation protection system comprises a wire management system operable to couple to the spacecraft. The wire management system comprises a first wire orientation apparatus and a second wire orientation apparatus.

The oriented wire electrostatic radiation protection system further comprises a first wire coupled to the wire management system. The wire management system deploys the first wire from a first wire stowed position to a first wire extended position. The first wire orientation apparatus orients the first wire in the first wire extended position in a first wire orientation, where the first wire is oriented in a first wire direction toward, and in a parallel alignment with, an approach path of approaching solar particles.

The oriented wire electrostatic radiation protection system further comprises a second wire coupled to the wire management system. The wire management system deploys the second wire from a second wire stowed position to a second wire extended position. The second wire orientation apparatus orients the second wire in the second wire extended position in a second wire orientation, where the second wire is oriented in a second wire direction opposite to the first wire direction and away from the approach path of the approaching solar particles.

The oriented wire electrostatic radiation protection system further comprises a power supply having a power supply first portion coupled to the first wire. The power supply first portion charges the first wire, to obtain a positively-charged wire. The power supply further comprises a power supply second portion coupled to the second wire. The power supply second portion charges the second wire, to obtain a negatively-charged wire.

The oriented wire electrostatic radiation protection system further comprises a control system controlling operation of the oriented wire electrostatic radiation protection system. When the approaching solar particles travel in parallel and alongside the positively-charged wire toward the spacecraft, the positively-charged wire deflects the approaching solar particles away from the spacecraft, via electrostatic repulsion, and the positively-charged wire creates a radiation protection shielded region around the spacecraft, and the negatively-charged wire maintains a charge balance at a spacecraft position.

In another version there is provided a spacecraft for interplanetary space travel. The spacecraft comprises one or more solar particle detector devices coupled to the spacecraft. The one or more solar particle detector devices detect approaching solar particles originating from a solar source comprising one or more of, a solar wind, and a solar coronal mass ejection (CME).

The spacecraft further comprises one or more oriented wire electrostatic radiation protection systems coupled to the spacecraft. The one or more oriented wire electrostatic radiation protection systems comprise a wire management system comprising a first wire orientation apparatus and a second wire orientation apparatus.

The one or more oriented wire electrostatic radiation protection systems further comprise a first wire coupled to the wire management system. The wire management system deploys the first wire from a first wire stowed position to a first wire extended position. The first wire orientation apparatus orients the first wire in the first wire extended position in a first wire orientation, where the first wire is oriented in a first wire direction toward, and in a parallel alignment with, an approach path of approaching solar particles. The first wire orientation apparatus further maintains the first orientation of the first wire at a first wire predetermined distance from the spacecraft.

The one or more oriented wire electrostatic radiation protection systems further comprise a second wire coupled to the wire management system. The wire management system deploys the second wire from a second wire stowed position to a second wire extended position. The second wire orientation apparatus orients the second wire in the second wire extended position in a second wire orientation, where the second wire is oriented in a second wire direction, opposite to the first wire direction, and away from the approach path of the approaching solar particles. The second wire orientation apparatus further maintains the second orientation of the second wire at a second wire predetermined distance from the spacecraft.

The one or more oriented wire electrostatic radiation protection systems further comprise a power supply having a power supply first portion coupled to the first wire. The power supply first portion charges the first wire, to obtain a positively-charged wire. The power supply further comprise a power supply second portion coupled to the second wire. The power supply second portion charges the second wire, to obtain a negatively-charged wire.

The one or more oriented wire electrostatic radiation protection systems further comprise a control system, to control operation of the one or more oriented wire electrostatic radiation protection systems. When the approaching solar particles travel in parallel and alongside the positively-charged wire toward the spacecraft, the positively-charged wire deflects the approaching solar particles away from the spacecraft, via electrostatic repulsion, and the positively-charged wire creates a radiation protection shielded region around the spacecraft, to protect any spacecraft occupants and spacecraft equipment from solar particle radiation, and the negatively-charged wire maintains a charge balance at a spacecraft position.

In another version there is provided a method of protecting a spacecraft from solar particle radiation using one or more oriented wire electrostatic radiation protection systems. The method comprises the step of detecting, with one or more solar particle detector devices, approaching solar particles originating from a solar source comprising one or more of, a solar wind, and a solar coronal mass ejection (CME).

The method further comprises activating one or more oriented wire electrostatic radiation protection systems. Each of the one or more oriented wire electrostatic radiation protection systems comprises a wire management system coupled to the spacecraft. The wire management system comprises a first wire orientation apparatus and a second wire orientation apparatus. Each of the one or more oriented wire electrostatic radiation protection systems further comprises a first wire coupled to the wire management system, and a second wire coupled to the wire management system. Each of the one or more oriented wire electrostatic radiation protection system further comprises a power supply having a power supply first portion coupled to the first wire, and having a power supply second portion coupled to the second wire, and a control system, to control operation of the oriented wire electrostatic radiation protection system.

The method further comprises the step of deploying the first wire orientation apparatus, and deploying the first wire from a first wire stowed position to a first wire extended position. The method further comprises the step of deploying the second wire orientation apparatus, and deploying the second wire from a second wire stowed position to a second wire extended position.

The method further comprises the step of orienting, with the first wire orientation apparatus, the first wire in the first wire extended position in a first wire orientation, where the first wire is oriented in a first wire direction toward, and in a parallel alignment with, an approach path of the approaching solar particles. The method further comprises the step of orienting, with the second wire orientation apparatus, the second wire in the second wire extended position in a second wire orientation, where the second wire is oriented in a second wire direction, opposite to the first wire direction, and away from the approach path of the approaching solar particles.

The method further comprises the step of charging the first wire with the power supply first portion, to obtain a positively-charged wire. The method further comprises the step of charging the second wire with the power supply second portion, to obtain a negatively-charged wire.

The method further comprises the step of deflecting, with the positively-charged wire, the approaching solar particles away from the spacecraft, via electrostatic repulsion, when the approaching solar particles travel in parallel and alongside the positively-charged wire toward the spacecraft, to create a radiation protection shielded region around the spacecraft, and to protect the spacecraft from solar particle radiation. The method further comprises the step of maintaining, with the negatively-charged wire, a charge balance at a spacecraft position.

The features, functions, and advantages that have been discussed can be achieved independently in various versions of the disclosure or may be combined in yet other versions the further details of which can be seen with reference to the following description and drawings.

BRIEF DESCRIPTION OF THE DRAWINGS

The disclosure can be better understood with reference to the following detailed description taken in conjunction with the accompanying drawings which illustrate exemplary versions, but which are not necessarily drawn to scale, wherein:

FIG. 1 is an illustration of a functional block diagram showing an exemplary version of an oriented wire electrostatic radiation protection system of the disclosure coupled to a spacecraft;

FIG. 2A is an illustration of a schematic diagram showing an environmental view of a spacecraft in space, and showing solar particles approaching from a solar source;

FIG. 2B is an illustration of an enlarged view of circle 2B of FIG. 2A, showing an exemplary version of an oriented wire electrostatic radiation protection system with a positively-charged wire in a first wire extended position deflecting approaching solar particles, and with a negatively-charged wire in a second wire extended position;

Figures 3A, 3B:
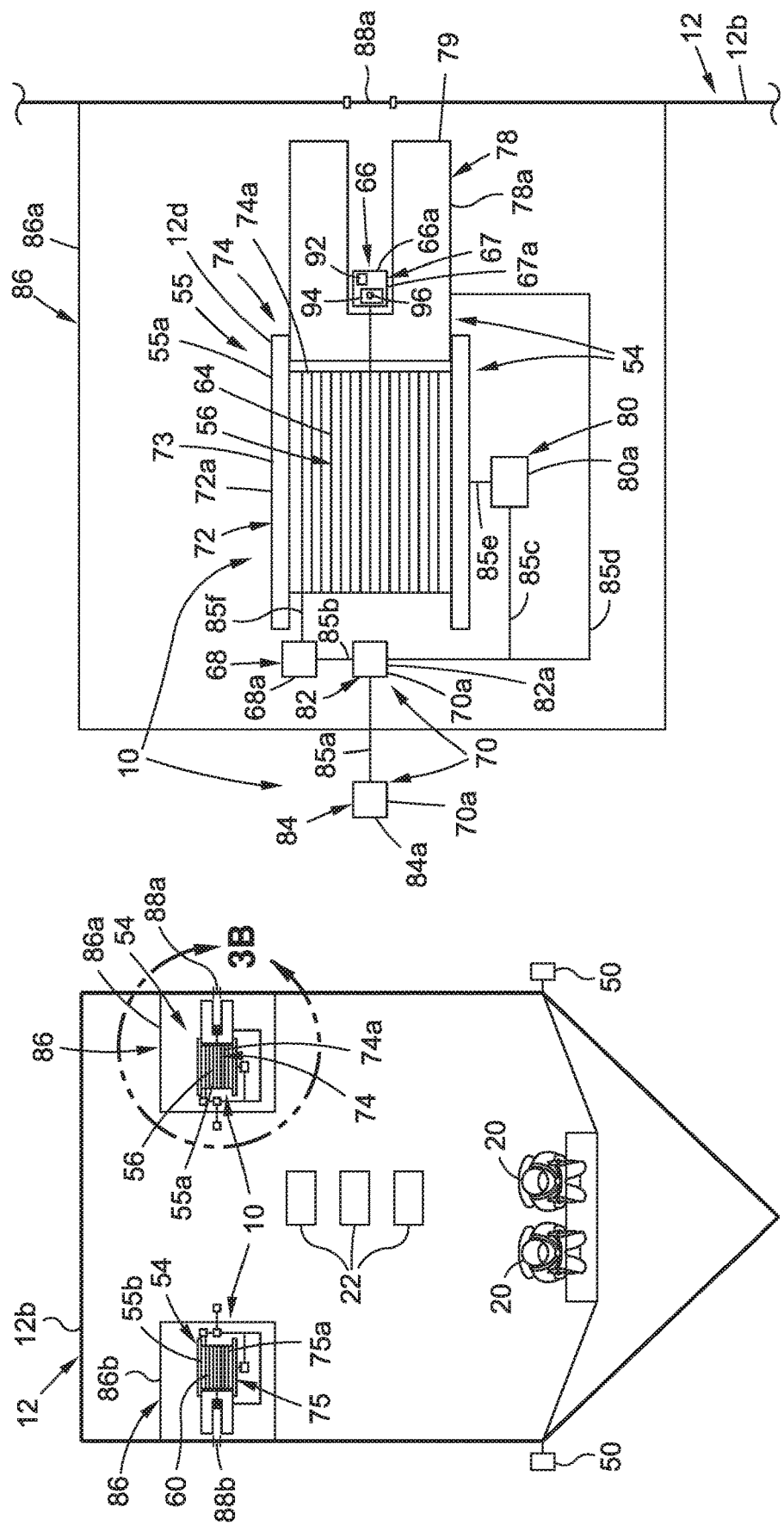
FIG. 3A is an illustration of a schematic diagram showing a top cut-away view of an exemplary version of an oriented wire electrostatic radiation protection system of the disclosure coupled to a spacecraft.
FIG. 3B is an illustration of an enlarged view of circle 3B of FIG. 3A, showing the oriented wire electrostatic radiation protection system with a first wire management assembly and a first wire in a first wire stowed position.

Each figure shown in this disclosure shows a variation of an aspect of the versions presented, and only differences will be discussed in detail.

DETAILED DESCRIPTION

Disclosed versions or embodiments will now be described more fully hereinafter with reference to the accompanying drawings, in which some, but not all, of the disclosed versions or embodiments are shown. Indeed, several different versions may be provided and should not be construed as limited to the versions set forth herein. Rather, these versions are provided so that this disclosure will be thorough and fully convey the scope of the disclosure to those skilled in the art.

Now referring to the Figures, FIG. 1 is an illustration of a functional block diagram showing an exemplary version of an oriented wire electrostatic radiation protection system 10 of the disclosure configured for coupling to, or coupled to, a spacecraft 12. As shown in FIG. 1, the spacecraft 12 preferably comprises an interplanetary spacecraft 12a designed for interplanetary space travel 14 in space 16 and between planets 18 within a single planetary system, for example, interplanetary space travel 14 between the planets 18 of Earth 18a and Mars 18b, and beyond Earth's 18a protective magnetic field. The spacecraft 12 may also be designed for other travel in space 16 beyond Earth's 18a protective magnetic field. The spacecraft 12 may further comprise space stations that orbit around the Earth, Mars, or any of the Earth or Martian moons, or that orbit around other planets, moons, or celestial bodies.

In one version, as shown in FIG. 1, the spacecraft 12 may comprise a manned spacecraft 12b with one or more spacecraft occupants 20, for example, one or more astronauts or space travelers. In another version, as shown in FIG. 1, the spacecraft 12 may comprise an unmanned spacecraft 12c with no spacecraft occupants 20, for example, space probes, robotic spacecraft, unmanned resupply spacecraft, space observatories, and other types of unmanned spacecraft 12c.

The oriented wire electrostatic radiation protection system 10 (see FIG. 1) provides protection to the spacecraft 12 (see FIG. 1), including protection to any spacecraft occupants 20 (see FIG. 1) and spacecraft equipment 22 (see FIG. 1), such as electronic spacecraft equipment, in the spacecraft 12, from exposure to solar particles 24 (see FIG. 1), such as in the form of solar particle radiation 26 (see FIG. 1). The solar particles 24, such as approaching solar particles 24a (see FIG. 1), approach the spacecraft 12 along an approach path 28 (see FIG. 1) and originate from a solar source 30 (see FIG. 1) at the Sun 30a (see FIG. 1). As shown in FIG. 1, the solar source 30 comprises one or more of, a solar wind 32, a solar particle event 34, such as a solar coronal mass ejection (CME) 36, for example, a solar CME 36 associated with a solar flare 38, or another type of solar source 30 at the Sun 30a.

As shown in FIG. 1, the solar particles 24, such as the approaching solar particles 24a, comprise high energy solar particles 24b. In particular, the solar particles 24, such as the approaching solar particles 24a, comprise charged particles 40 (see FIG. 1), including protons 42 (see FIG. 1) having a positive charge, also referred to as positively-charged protons 42a (see FIG. 1). The protons 42 typically comprise high energy protons. As further shown in FIG. 1, the solar particles 24, such as the approaching solar particles 24a, may further comprise charged particles 40, including electrons 44 (see FIG. 1) having a negative charge, also referred to as negatively-charged electrons 44a (see FIG. 1). The electrons 44 typically comprise high energy electrons. As further shown in FIG. 1, the solar particles 24, such as the approaching solar particles 24a, may further comprise heavy ions 46, neutrons 48, or other types of solar particles 24.

The oriented wire electrostatic radiation protection system 10 (see FIG. 1) includes a first wire 56 (see FIG. 1), such as a positively-charged wire 56a (see FIG. 1), discussed, in further detail below, that is designed to deflect positively-charged ions, and in particular, protons 42. The oriented wire electrostatic radiation protection system 10 (see FIG. 1) further preferably includes a second wire 60 (see FIG. 1), such as a negatively-charged wire 60a (see FIG. 1), discussed in further detail below, that functions as a counter-electrode 60b (see FIG. 1) to maintain a charge balance 51 (see FIG. 1) with the positively-charged wire 56a, or protection electrode 56b (see FIG. 1). One oriented wire electrostatic radiation protection system 10 (see FIG. 1) with a pair of wires, including the first wire 56 and the second wire 60, may be used with the spacecraft 12. Alternatively, multiple oriented wire electrostatic radiation protection systems 10 (see FIG. 1) with multiple pairs of wires, including first wires 56 and second wires 60, may be used with the spacecraft 12, with multiple spacecraft 12, and with space stations that orbit around the Earth, Mars, or any of the Earth or Martian moons, or that orbit around other planets, moons, or celestial bodies. The multiple oriented wire electrostatic radiation protection systems 10 (see FIG. 1) with the multiple pairs of wires, including multiple first wires 56 and multiple second wires 60, are preferably designed to handle multiple directions of solar particles 24, such as approaching solar particles 24a, comprising charged particles 40, or other approaching particles or cosmic rays, such as galactic cosmic rays, high-energy particles originating outside the solar system, and other high-energy particles. In addition to in-transit applications, the one or more oriented wire electrostatic radiation protection systems 10 may be used for ground applications, including ground-based installations 13 (see FIG. 1), for example, on the ground of Mars, asteroids, moons of Earth, Mars, or another planet, or other celestial bodies. As used herein, "ground" and "ground-based" mean a non-Earth surface, including a surface of Mars, an asteroid, a moon, or another celestial body. With such ground applications and ground-based installations 13, the one or more oriented wire electrostatic radiation protection systems 10 protect the spacecraft 12, space station, space probe, robotic spacecraft, unmanned resupply spacecraft, ground-based habitat, ground-based installation, temporary or permanent-shelter or dwelling, manned or unmanned installation or facility, space observatory, or other type of manned or unmanned spacecraft, from solar particles 24, such as approaching solar particles 24a, or galactic cosmic rays or other high-energy particles. In addition, with such ground applications and ground-based installations 13, the first wire 56 (see FIG. 1), such as the positively-charged wire 56a (see FIG. 1), would be used, and the second wire 60 (see FIG. 1), such as the negatively-charged wire 60a (see FIG. 1), may optionally be used or not used.

As shown in FIG. 1, the spacecraft 12 preferably includes one or more solar particle detector devices 50 coupled to the spacecraft 12, or coupled to other spacecraft, satellites, telecommunications devices, space-based stations, Earth-based stations, or Mars-based stations, in communication with the spacecraft 12, or ground-based installation 13 of any type. In one version, for manned spacecraft 12b (see FIG. 1), the one or more solar particle detector devices 50 may comprise sensor devices and processing circuitry and/or antennas, for example, a charged particle detector, an optical detector, a detector of approaching particle direction or vector, a remote warning signal provided to a spacecraft protection system control from a different spacecraft, from a warning satellite or satellite array, or from Earth-based observers or automated warning system, or another suitable solar particle detector device 50. The one or more solar particle detector devices 50 detect the approaching solar particles 24a, such as in the form of solar particle radiation 26, to alert the spacecraft occupants 20 (see FIG. 1), or ground-based installation occupants 21 (see FIG. 1), and to provide sufficient time to deploy or activate the oriented wire electrostatic radiation protection system 10 (see FIG. 1), before the approaching solar particles 24a reach a spacecraft position 52 (see FIG. 1) of the manned spacecraft 12b in space 16. In another version, for unmanned spacecraft 12c (see FIG. 1), the one or more solar particle detector devices 50 may comprise antennas or sensor devices, for example, a charged particle detector, an optical detector, a detector of approaching particle direction or vector, a remote warning signal provided to a spacecraft protection system control from a different spacecraft, from a warning satellite or satellite array, or from Earth-based observers or automated warning system, or another suitable solar particle detector device 50, to receive warnings of the approaching solar particles 24a, such as in the form of solar particle radiation 26, via Earth-based devices or other space-based devices in communication with the unmanned spacecraft 12c, and to provide sufficient time to deploy or activate the oriented wire electrostatic radiation protection system 10 (see FIG. 1), before the approaching solar particles 24a reach the spacecraft position 52 of the unmanned spacecraft 12c in space 16.

One or more oriented wire electrostatic radiation protection systems 10 (see FIG. 1) may be coupled to, or configured to be coupled to, the spacecraft 12 (see FIG. 1). As shown in FIG. 1, the one or more oriented wire electrostatic radiation protection systems 10 each comprise a wire management system 54 for coupling to the spacecraft 12. The wire management system 54 (see FIG. 1) is coupled to a portion 12d (see FIG. 1) of the spacecraft 12 (see FIG. 1). The wire management system 54 (see FIG. 1) comprises one or more wire management assemblies 55 (see FIG. 1), including, for example, a first wire management assembly 55a (see FIG. 3A) and a second wire management assembly 55b (see FIG. 3A). The wire management system 54 further comprises a plurality of wire orientation apparatuses 66 (see FIG. 1), in the form of, for example, a microsatellite 67 (see FIG. 1). The plurality of wire orientation apparatuses 66 (see FIG. 1) may include a first wire orientation apparatus 66a (see FIGS. 1, 3B), such as in the form of a first microsatellite 67a (see FIG. 3B), and may include a second wire orientation apparatus 66b (see FIGS. 1, 3D), such as in the form of a second microsatellite 67b (see FIG. 3D).

As shown in FIG. 1, the one or more oriented wire electrostatic radiation protection systems 10 further comprise one or more first wires 56, such as one or more positively-charged wires 56a, coupled to the wire management system 54. The first wire 56, such as the positively-charged wire 56a, functions as a protection electrode 56b (see FIG. 1) for the spacecraft 12. The first wire 56 may be in the form of a multi-strand wire 64, or a cable, and the first wire 56 has a first end 57a (see FIG. 3C), a second end 57b (see FIG. 3C), a length 58 (see FIG. 1), and a diameter 59 (see FIG. 1). The first end 57a of the first wire 56, such as the positively-charged wire 56a, in the form of the multi-strand wire 64, or cable, is attached to the wire management system 54. The second end 57b of the first wire 56 is attached to the wire orientation apparatus 66, such as the first wire orientation apparatus 66a (see FIG. 3C). The wire management system 54 deploys, or is configured to deploy, the first wire 56 from a first wire stowed position 74 (see FIGS. 1, 3B), such as a first wire spooled position 74a (see FIG. 1), to a first wire extended position 76 (see FIGS. 1, 3C), such as a first wire unspooled position 76a (see FIG. 1), and retracts, or is configured to retract, the first wire 56 from the first wire extended position 76 back to the first wire stowed position 74.

As shown in FIG. 1, the one or more oriented wire electrostatic radiation protection systems 10 further comprise one or more second wires 60, such as one or more negatively-charged wires 60a, coupled to the wire management system 54. The second wire 60, such as the negatively-charged wire 60a, functions as a counter-electrode 60b (see FIG. 1) to maintain a charge balance 51 (see FIG. 1) with the positively-charged wire 56a, or protection electrode 56b (see FIG. 1). The second wire 60 may be in the form of a multi-strand wire 64, or a cable, and the second wire 60 has a first end 61a (see FIG. 3D), a second end 61b (see FIG. 3D), a length 62 (see FIG. 1), and a diameter 63 (see FIG. 1). The first end 61a of the second wire 60, such as the negatively-charged wire 60a, in the form of the multi-strand wire 64 or cable, is attached to the wire management system 54. The second end 61b of the second wire 60 is attached to the wire orientation apparatus 66, such as the second wire orientation apparatus 66b (see FIG. 3D). The wire management system 54 deploys, or is configured to deploy, the second wire 60 from a second wire stowed position 75 (see FIG. 1), such as a second wire spooled position 75a (see FIG. 1), to a second wire extended position 77 (see FIG. 1), such as a second wire unspooled position 77a (see FIG. 1), and retracts, or is configured to retract, the second wire 60 from the second wire extended position 77 back to the second wire stowed position 75.

The one or more second wires 60 (see FIG. 1), such as the negatively-charged wires 60a (see FIG. 1), or counter-electrode 60b (see FIG. 1), may be mounted on the opposite side of the spacecraft 12, as the one or more first wires 56 (see FIG. 1), such as the positively-charged wires 56a (see FIG. 1), or protection electrode 56b (see FIG. 1). Alternatively, the one or more first wires 56, such as the positively-charged wires 56a, or protection electrode 56b, and the one or more second wires 60, such as the negatively-charged wires 60a, or counter-electrode 60b, may be mounted on a pylon, or the like, projecting out from the body of the spacecraft 12, and allowing clearance for the one or more first wires 56 to extend in a direction 100 (see FIG. 1), such as a first wire direction 100a (see FIG. 1), toward the approaching solar particles 24a (see FIG. 1), and allowing clearance for the one or more second wires 60 to extend in a direction 100 (see FIG. 1), such as a second wire direction 100b (see FIG. 1), in the opposite direction away from the approaching solar particles 24a (see FIG. 1). In yet another version, the one or more first wires 56, such as the positively-charged wires 56a, or protection electrode 56b, and the one or more second wires 60, such as the negatively-charged wires 60a, or counter-electrode 60b, may be housed in or on one or more separate spacecraft that accompany a main spacecraft, or several spacecraft, that may then travel within a radiation protection shielded region 110 (see FIGS. 1, 2B) created by the positively-charged wire 56a, or wires, at a spacecraft position 52 (see FIG. 1). For example, a manned spacecraft 12b (see FIG. 1) may be a spacecraft 12 that accompanies an unmanned spacecraft 12c (see FIG. 1) which houses the one or more oriented wire electrostatic radiation protection systems 10, and which shuttles between the orbits of Earth 18a (see FIG. 1) and Mars 18b (see FIG. 1).

As shown in FIG. 1, the one or more oriented wire electrostatic radiation protection systems 10 further comprise one or more power supplies 68. Preferably, the oriented wire electrostatic radiation protection systems 10 comprises one power supply 68 having a power supply first portion 68a (see FIG. 1), such as a positive terminal 69a (see FIG. 1), coupled or connected to the first wire 56, to charge the first wire 56 with a positive voltage, to obtain a positively-charged wire 56a, which creates an approximately cylindrical, or radially symmetric charged region around the positively-charged wire 56a. The power supply 68 (see FIG. 1) further includes a power supply second portion 68b (see FIG. 1), such as a negative terminal 69b (see FIG. 1), coupled or connected to the second wire 60, to charge the second wire 60 with a negative voltage, to obtain a negatively-charged wire 60a. The power supply 68 (see FIG. 1) further includes a ground terminal 69c (see FIG. 1). Preferably, the power supply 68, including the power supply first portion 68a and the power supply second portion 68b, comprises a high voltage power supply 68c (see FIG. 1). In one version, the power supply 68 may comprise a high voltage section, a high voltage insulation between an output terminal and the positively-charged wire 56a, and a second insulated terminal connecting to one or more negatively-charged wires 60a, or wire array, forming the negatively-charged wire 60a, or wires, in space 16. The negatively-charged wire 60a, or wires, allow(s) the spacecraft 12 to remain at ground voltage in relation to the voltage on the positively-charged wire 56a.

As shown in FIG. 1, the one or more oriented wire electrostatic radiation protection systems 10 further comprise one or more control systems 70, to control operation of the one or more oriented wire electrostatic radiation protection systems 10. For example, in one version, the one or more control systems 70 (see FIGS. 1, 3B, 3D) may comprise a first control system 70a (see FIG. 3B), and a second control system 70b (see FIG. 3D).

Figure 3C:
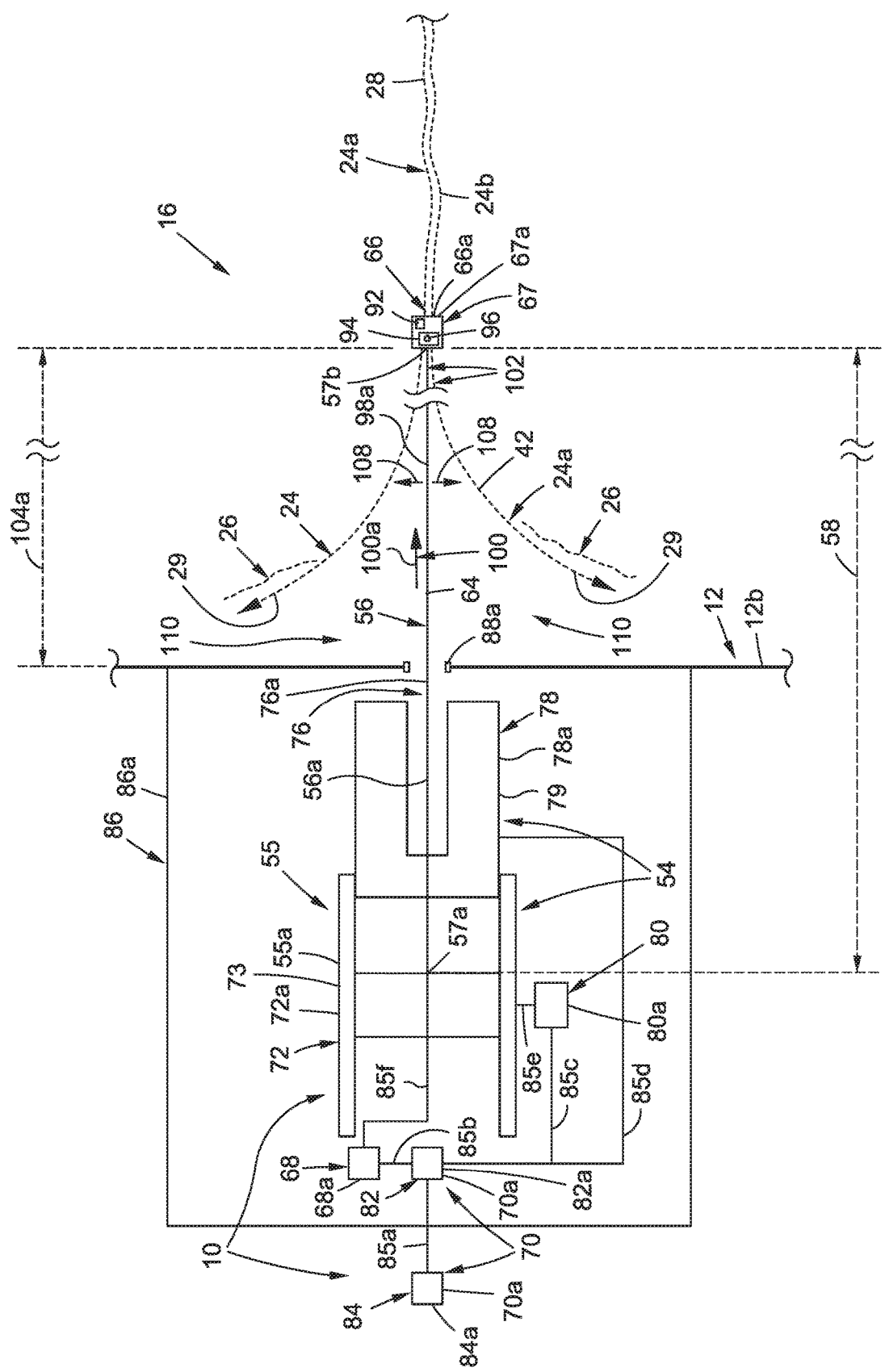
FIG. 3C is an illustration of a schematic diagram showing a close-up, top cut-away view of the oriented wire electrostatic radiation protection system of FIG. 3B with a positively-charged wire in a first wire extended position.
Figure 3D:
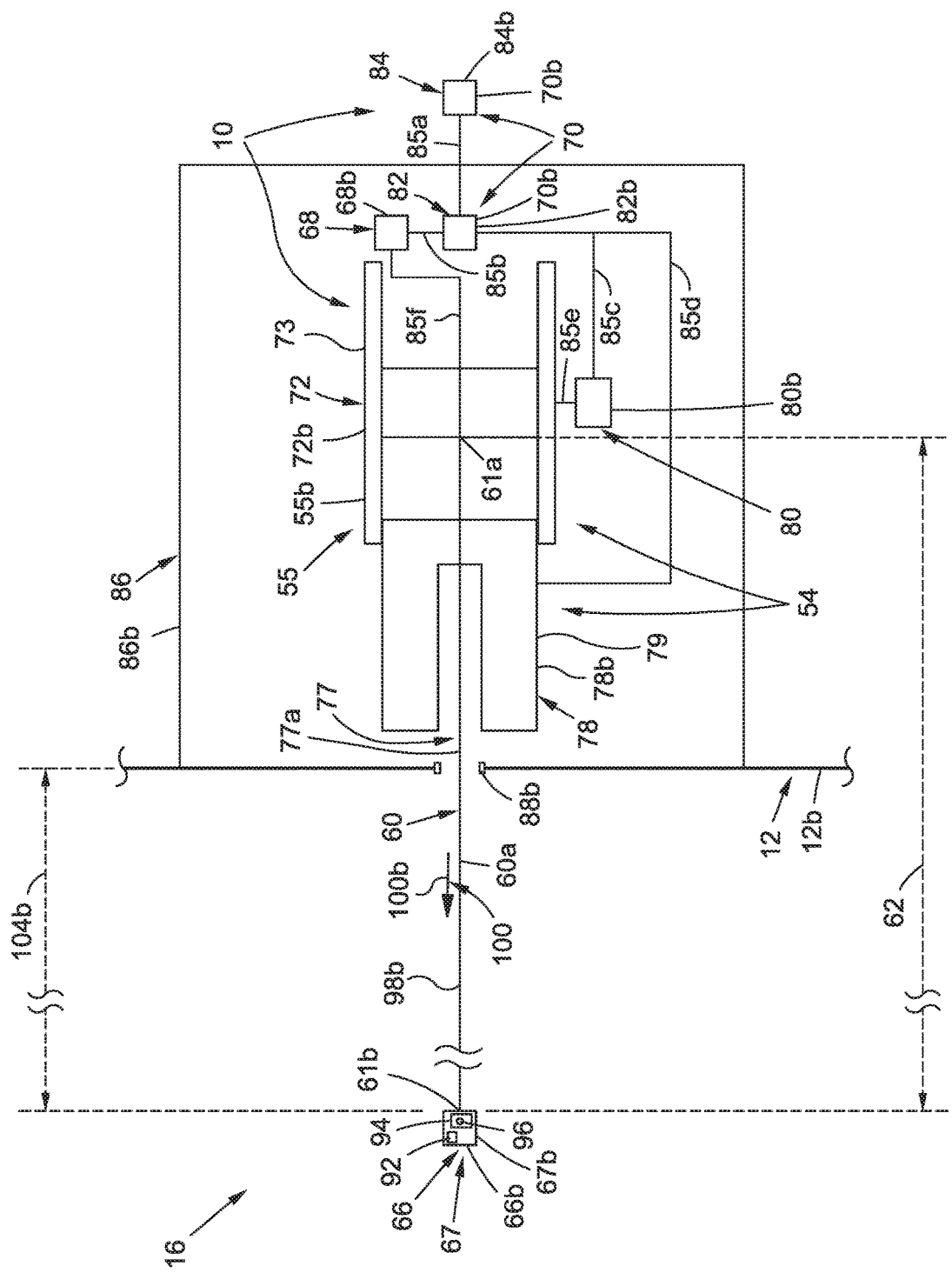
FIG. 3D is an illustration of a schematic diagram showing a close-up, top cut-away view of the oriented wire electrostatic radiation protection system of FIG. 3A with a second wire management assembly and a negatively-charged wire in a second wire extended position.

In particular, the wire management system 54 (see FIG. 1) preferably includes one or more wire management assemblies 55 (see FIG. 1), such as the first wire management assembly 55a (see FIG. 3B) and the second wire management assembly 55b (see FIG. 3D). The wire management assembly 55 comprises a spooling apparatus 72 (see FIG. 1), such as in the form of a spool 73 (see FIG. 1). The spooling apparatus 72 (see FIGS. 1, 3B) may include a first spooling apparatus 72a (see FIG. 3B), that holds or carries, or is configured to hold or carry, the first wire 56 (see FIGS. 1, 3B), in the first wire stowed position 74 (see FIGS. 1, 3B), such as the first wire spooled position 74a (see FIGS. 1, 3B). The spooling apparatus 72 (see FIGS. 1, 3D), may further include a second spooling apparatus 72b (see FIG. 3D), that holds or carries, or is configured to hold or carry, the second wire 60 (see FIGS. 1, 3D), in the second wire stowed position 75 (see FIGS. 1, 3A), such as the second wire spooled position 75a (see FIGS. 1, 3A).

In addition, the spooling apparatus 72, such as the first spooling apparatus 72a (see FIG. 3B), assists, or is configured to assist, in deploying the first wire 56 (see FIGS. 1, 3B), such as in the form of multi-strand wire 64 (see FIG. 3C), or cable, from the first wire stowed position 74 (see FIGS. 1, 3B), such as the first wire spooled position 74a (see FIGS. 1, 3B), to the first wire extended position 76 (see FIGS. 1, 3C), such as the first wire unspooled position 76a (see FIGS. 1, 3C), away from the spacecraft 12 and toward the solar source 30 (see FIG. 1). In addition, the spooling apparatus 72, such as the second spooling apparatus 72b (see FIG. 3D), assists, or is configured to assist, in deploying the second wire 60 (see FIGS. 1, 3D), such as in the form of multi-strand wire 64 (see FIG. 3D), or cable, from the second wire stowed position 75 (see FIGS. 1, 3A), such as the second wire spooled position 75a (see FIGS. 1, 3A), to the second wire extended position 77 (see FIGS. 1, 3D), such as the second wire unspooled position 77a (see FIGS. 1, 3D), away from the spacecraft 12 and the solar source 30, and opposite to the first wire 56.

The spooling apparatus 72, such as the first spooling apparatus 72a (see FIG. 3C), also retracts, or is configured to retract, the first wire 56 (see FIGS. 1, 3C), such as the positively-charged wire 56a (see FIGS. 1, 3C), in the form of multi-strand wire 64 (see FIGS. 1, 3C), or cable, from the first wire extended position 76 (see FIGS. 1, 3C) back to the first wire stowed position 74 (see FIGS. 1, 3B). The spooling apparatus 72, such as the second spooling apparatus 72b (see FIG. 3D), also retracts, or is configured to retract, the second wire 60 (see FIGS. 1, 3D), such as the negatively-charged wire 60a (see FIGS. 1, 3D), in the form of multi-strand wire 64 (see FIGS. 1, 3D), or cable, from the second wire extended position 77 (see FIGS. 1, 3D) back to the second wire stowed position 75 (see FIGS. 1, 3A). The spooling apparatus 72 is not limited to being in the form of a spool 73, and may comprise another suitable apparatus or device for holding, carrying, deploying, actively sensing and controlling a tension 106 (see FIG. 1), such as a first wire tension 106a (see FIG. 1), in the first wire 56, and a tension 106, such as a second wire tension 106b (see FIG. 1), in the second wire 60, and retracting the first wire 56 or the second wire 60.

As shown in FIG. 1, the wire management assembly 55 preferably further includes a deployment apparatus 78 coupled to the spooling apparatus 72. The first wire management assembly 55a (see FIG. 3B) may include a deployment apparatus 78 (see FIGS. 1, 3D), such as a first deployment apparatus 78a (see FIG. 3B), and the second wire management assembly 55b (see FIG. 3D) may include a deployment apparatus 78 (see FIGS. 1, 3D), such as a second deployment apparatus 78b (see FIG. 3D). The deployment apparatus 78 (see FIGS. 1, 3B, 3D) may be in the form of a launch device 79 (see FIGS. 1, 3B, 3D), or another suitable deployment device or apparatus, that may be mechanically operated, electrically powered, or operated with another suitable device or apparatus. The deployment apparatus 78 (see FIGS. 1, 3C), such as the first deployment apparatus 78a (see FIG. 3C), deploys, or is configured to deploy, the wire orientation apparatus 66 (see FIGS. 1, 3C), such as the first wire orientation apparatus 66a (see FIG. 3C), attached to the second end 57b (see FIG. 3C) of the first wire 56 (see FIGS. 1, 3C), such as the positively-charged wire 56a (see FIGS. 1, 3C), or cable, and the deployment apparatus 78, such as the first deployment apparatus 78a, deploys, or is configured to deploy, the first wire 56 (see FIGS. 1, 3C), such as the positively-charged wire 56a (see FIGS. 1, 3C), or cable, from the first wire stowed position 74 (see FIGS. 1, 3B) to the first wire extended position 76 (see FIGS. 1, 3C). Further, the deployment apparatus 78 (see FIGS. 1, 3D), such as the second deployment apparatus 78b (see FIG. 3D), deploys, or is configured to deploy, the wire orientation apparatus 66 (see FIGS. 1, 3D), such as the second wire orientation apparatus 66b (see FIG. 3D), attached to the second end 61b (see FIG. 3D) of the second wire 60 (see FIGS. 1, 3D), such as the negatively-charged wire 60a (see FIGS. 1, 3D), or cable, and the deployment apparatus 78, such as the second deployment apparatus 78b, deploys, or is configured to deploy, the second wire 60, such as the negatively-charged wire 60a, or cable, from the second wire stowed position 75 (see FIGS. 1, 3A) to the second wire extended position 77 (see FIGS. 1, 3D).

As shown in FIG. 1, the wire management assembly 55 may further include one or more motors 80 (see also FIGS. 1, 3B, 3D) coupled to the spooling apparatus 72, to drive or power the spooling apparatus 72. The one or more motors 80 (see FIG. 1) may comprise a first motor 80a (see FIG. 3B) coupled to the first spooling apparatus 72a (see FIG. 3B), to drive or power the first spooling apparatus 72a. The one or more motors 80 (see FIG. 1) may further comprise a second motor 80b (see FIG. 3D) coupled to the second spooling apparatus 72b (see FIG. 3D), to drive or power the second spooling apparatus 72b. Alternatively, instead of one or more motors 80 driving or powering the spooling apparatus 72, other suitable power devices may be used to drive or power the spooling apparatus 72.

As shown in FIG. 1, the wire management assembly 55 may further include a controller 82 and a control interface 84, which are preferably both part of the control system 70. For example, the first wire management assembly 55a (see FIG. 3B) may include a controller 82 (see FIGS. 1, 3B), such as a first controller 82a (see FIG. 3B), and may include a control interface 84 (see FIGS. 1, 3B), such as a first control interface 84a (see FIG. 3B), which are preferably both part of the control system 70, such as a first control system 70a (see FIG. 3C). As a further example, the second wire management assembly 55b (see FIG. 3D) may include a controller 82 (see FIGS. 1, 3D), such as a second controller 82b (see FIG. 3D), and may include a control interface 84 (see FIGS. 1, 3D), such as a second control interface 84b (see FIG. 3D), which are preferably both part of the control system 70, such as a second control system 70b (see FIG. 3D).

The control interface 84, such as the first control interface 84a, and the second control interface 84b, may each be connected, via a first connection 85a (see FIGS. 3B, 3D), such as a wired connection, to the controller 82, such as the first controller 82a, and the second controller 82b, respectively. The controller 82, such as the first controller 82a, and the second controller 82b, may each be connected, via a second connection 85b (see FIGS. 3B, 3D), such as wired connection, to the power supply first portion 68a of the power supply 68, and the power supply second portion 68b of the power supply 68, respectively. The controller 82, such as the first controller 82a and the second controller 82b, may each be further connected, via a third connection 85c (see FIGS. 3B, 3D), such as a wired connection, to the motor 80, such as the first motor 80a and the second motor 80b, respectively. The controller 82, such as the first controller 82a and the second controller 82b, may each be further connected, via a fourth connection 85d (see FIGS. 3B, 3D), such as a wired connection, to the deployment apparatus 78, such as the first deployment apparatus 78a and the second deployment apparatus 78b, respectively, to control operation of the deployment apparatus 78. The motor 80, such as the first motor 80a, and the second motor 80b, may each be connected, via a fifth connection 85e (see FIGS. 3B, 3D), such as a wired connection, to the spooling apparatus 72, such as the first spooling apparatus 72a and the second spooling apparatus 72b, respectively, so that the controller 82 controls operation of the spooling apparatus 72, via the motor 80. The power supply first portion 68a and the power supply second portion 68b, may each be connected, via a sixth connection 85f (see FIGS. 3B, 3D), such as a wired connection, to the first wire 56, and the second wire 60, respectively, to facilitate charging of the first wire 56, and charging of the second wire 60.

The control system 70 preferably includes the controller 82 and the control interface 84 for each wire management assembly 55. The control system 70 may further comprise additional control system elements, including processing circuitry, sensors, additional connection elements, command controls, and other suitable control system elements. The control system 70 may be used with one or more computers onboard the spacecraft 12, and/or with external communication and processing systems based on Earth or on other space-based vehicles.

With regard to the first wire 56 (see FIG. 1) and the second wire 60 (see FIG. 1) of the oriented wire electrostatic radiation protection system 10 (see FIG. 1), the first wire 56 and the second wire 60 may be in the form of the multi-strand wire 64 (see FIG. 1) For example, the multi-strand wire 64 may comprise a parallel bonded magnet wire, such as, a MULTIFILAR magnet wire obtained from MWS Precision Wire Industries, Inc. of West Lake Village, Calif. (MULTIFILAR is a registered trademark of MWS Precision Wire Industries, Inc. of West Lake Village, Calif.) However, other suitable multi-strand wires may also be used. Alternatively, a cable may be used instead of a first wire 56 or second wire 60.

The first wire 56 (see FIGS. 1, 3B), such as in the form of the multi-strand wire 64, or cable, has the first end 57a (see FIG. 3C), the second end 57b (see FIG. 3C), and a length 58 extending between the first end 57a and the second end 57b. The first end 57a of the first wire 56, such as in the form of the multi-strand wire 64, or cable, is attached to the wire management assembly 55, such as the first wire management assembly 55a, of the wire management system 54, and in particular, is attached to the first spooling apparatus 72a of the first wire management assembly 55a. The second end 57b of the first wire 56, such as in the form of the multi-strand wire 64, or cable, is attached to the wire orientation apparatus 66, such as the first wire orientation apparatus 66a.

The second wire 60 (see FIGS. 1, 3A), such as in the form of the multi-strand wire 64, or cable, has the first end 61a (see FIG. 3D), the second end 61b (see FIG. 3D), and a length 62 (see FIG. 3D) extending between the first end 61a and the second end 61b. The first end 61a of the second wire 60, such as in the form of the multi-strand wire 64, or cable, is attached to the wire management assembly 55, such as the second wire management assembly 55b, of the wire management system 54, and in particular, is attached to the second spooling apparatus 72b of the second wire management assembly 55b. The second end 61b of the second wire 60, such as in the form of the multi-strand wire 64, or cable, is attached to the wire orientation apparatus 66, such as the second wire orientation apparatus 66b.

The first wire 56 and the second wire 60, such as in the form of the multi-strand wire 64, or cable, are preferably comprised of one or more conductive metal materials 90 (see FIG. 1). The one or more conductive metal materials 90 may comprise one or more of aluminum, copper, iron, silver, gold, nickel, brass, zinc, tin, steel, lead, or another suitable strong and conductive metal material 90.

The length 58 (see FIG. 1) of the first wire 56 (see FIG. 1), such as the positively-charged wire 56a (see FIG. 1), is preferably in a range of from 1000 meters (m) to 5000 meters (m), and more preferably, in a range of from 3000 meters (m) to 4000 meters (m), in order to limit the required charge voltage to less than 10 MV (ten megavolts) for protection against solar particles 24 (see FIG. 1) with an energy of 250 MeV (two-hundred fifty megaelectron volts) or less. However, other lengths may be used, and the length 58 chosen, or predetermined, depends on the design and strength of the materials used to make the first wire 56, such as in the form of the multi-strand wire 64, or the cable, as well as the design and size of the spacecraft 12 used with the first wire 56.

The length 62 (see FIG. 1) of the second wire 60 (see FIG. 1), such as the negatively-charged wire 60a (see FIG. 1), is preferably in a range of from 1000 meters (m) to 5000 meters (m), and more preferably, in a range of from 3000 meters (m) to 4000 meters (m). However, other lengths may be used, and the length 62 chosen, or predetermined, depends on the design and strength of the materials used to make the second wire 60, such as in the form of the multi-strand wire 64, or the cable, as well as the design and size of the spacecraft 12 used with the second wire 60, such as the multi-strand wire 64, or the cable. The length 58 of the first wire 56 and the length 62 of the second wire 60 may be the same, or the length 58 of the first wire 56 may be different than the length 62 of the second wire 60.

The first wire 56 (see FIG. 1), such as in the form of the multi-strand wire 64, or cable, preferably has a diameter 59 (see FIG. 1) in a range of from 0.5 millimeter (mm) to 2.0 millimeters (mm), and more preferably, in a range of from 1 millimeter (mm) to 1.5 millimeters (mm). However, other diameter sizes may be used, and the diameter 59 chosen, or predetermined, depends on the design and strength of the materials used to make the first wire 56, such as the multi-strand wire 64, or cable, as well as the design and size of the spacecraft 12 used with the first wire 56, such as the multi-strand wire 64, or cable.

The second wire 60 (see FIG. 1), such as in the form of the multi-strand wire 64, or cable, preferably has a diameter 63 (see FIG. 1) in a range of from 0.5 millimeter (mm) to 2.0 millimeters (mm), and more preferably, in a range of from 1 millimeter (mm) to 1.5 millimeters (mm). However, other diameter sizes may be used, and the diameter 63 chosen, or predetermined, depends on the design and strength of the materials used to make the second wire 60, such as the multi-strand wire 64, or cable, as well as the design and size of the spacecraft 12 used with the second wire 60, such as the multi-strand wire 64, or cable.

The first wire 56, such as the multi-strand wire 64, or cable, is deployed or unspooled by the spooling apparatus 72 (see FIGS. 1, 3B), such as the first spooling apparatus 72a (see FIG. 3B), for example, in the form of a spool 73 (see FIGS. 1, 3B), of the wire management assembly 55, such as the first wire management assembly 55a (see FIG. 3B), from the first wire stowed position 74 (see FIGS. 1, 3B) to the first wire extended position 76 (see FIGS. 1, 3C). The first wire 56, such as the positively-charged wire 56a, in the form of the multi-strand wire 64, or cable, is retracted or spooled by the spooling apparatus 72, such as the first spooling apparatus 72a, of the wire management assembly 55, such as the first wire management assembly 55a, from the first wire extended position 76 back to the first wire stowed position 74.

The second wire 60, such as the multi-strand wire 64, or cable, is deployed or unspooled by the spooling apparatus 72 (see FIGS. 1, 3D), such as the second spooling apparatus 72b (see FIG. 3D), for example, in the form of a spool 73 (see FIGS. 1, 3D), of the wire management assembly 55, such as the second wire management assembly 55b (see FIG. 3D), from the second wire stowed position 75 (see FIGS. 1, 3A) to the second wire extended position 77 (see FIGS. 1, 3D). The second wire 60, such as the negatively-charged wire 60a, in the form of the multi-strand wire 64, or cable, is retracted or spooled by the spooling apparatus 72, such as the second spooling apparatus 72b, of the wire management assembly 55, such as the second wire management assembly 55b, from the second wire extended position 77 back to the second wire stowed position 75.

When the approaching solar particles 24a (see FIG. 1) from a solar wind 32 (see FIG. 1) or a solar particle event 34 (see FIG. 1), such as a solar coronal mass ejection (CME) 36 (see FIG. 1), are detected by the one or more solar particle detector devices 50 (see FIG. 1), the first wire 56 (see FIG. 1), such as the multi-strand wire 64, or cable, is deployed, or may already be deployed in the first wire extended position 76 (see FIG. 1), such as the first wire unspooled position 76a (see FIG. 1), and is charged with the power supply first portion 68a (see FIG. 1), such as the positive terminal 69a (see FIG. 1), of the power supply 68 (see FIG. 1), for example, a high voltage power supply 68c (see FIG. 1), to obtain the positively-charged wire 56a (see FIG. 1). In addition, the second wire 60 (see FIG. 1), such as the multi-strand wire 64, or cable, is deployed, or may already be deployed in the second wire extended position 77 (see FIG. 1), such as the second wire unspooled position 77a (see FIG. 1), and is charged with the power supply second portion 68b (see FIG. 1), such as the negative terminal 69b (see FIG. 1), of the power supply 68 (see FIG. 1), for example, a high voltage power supply 68c (see FIG. 1), to obtain the negatively-charged wire 60a (see FIG. 1).

The first wire 56 and the second wire 60 may be charged in seconds of time, and the charging voltage on the first wire 56 and the second wire 60 remains stable. The positively-charged wire 56a (see FIG. 1) deflects positively-charged protons 42a (see FIG. 1) of the approaching solar particles 24a (see FIG. 1), or solar particle stream, when the approaching solar particles 24a travel in parallel, or substantially in parallel, and alongside, the positively-charged wire 56a toward the spacecraft 12, for a substantial fraction of the length 58 (see FIG. 1) of the first wire 56, such as the positively-charged wire 56a. The first wire 56, such as the positively-charged wire 56a (see FIG. 1), functions or acts as the protection electrode 56b (see FIG. 1). The second wire 60, such as the negatively-charged wire 60a (see FIG. 1), functions as the counter-electrode 60b (see FIG. 1) to the positively-charged wire 56a or protection electrode 56b to maintain the charge balance 51 (see FIG. 1).

The first wire 56, such as the positively-charged wire 56a, and the second wire 60, such as the negatively-charged wire 60a, may preferably be charged to a range of from 4 MV (four megavolts) to 10 MV (ten megavolts), and more preferably, charged to a range of from 4 MV (four megavolts) to 5 MV (five megavolts). However, other voltages may be used, and the voltage chosen, or predetermined, primarily depends on the length 58 of the first wire 56 and the length 62 of the second wire 60, respectively, as well as the design and size of the spacecraft 12 used with the first wire 56 and the second wire 60.

As discussed above, the wire orientation apparatus 66 of the oriented wire electrostatic radiation protection system 10, is preferably in the form of, or comprises, a microsatellite 67. The wire orientation apparatuses 66 (see FIGS. 1, 3B) may comprise the first wire orientation apparatus 66a (see FIGS. 1, 3B), such as a first microsatellite 67a (see FIG. 3B), and may comprise the second wire orientation apparatus 66b (see FIGS. 1, 3D), such as a second microsatellite 67b (see FIG. 3D). The first microsatellite 67a (see FIG. 3C) is preferably an end-point microsatellite attached to the second end 57b (see FIG. 3C) of the first wire 56 (see FIG. 3B), such as the positively-charged wire 56a (see FIG. 3B). The second microsatellite 67b (see FIG. 3D) is preferably an end-point microsatellite attached to the second end 61b (see FIG. 3D) of the second wire 60 (see FIG. 3D), such as the negatively-charged wire 60a (see FIG. 3D). The wire orientation apparatus 66 (see FIGS. 1, 3B-3D), such as in the form of the microsatellite 67 (see FIGS. 1, 3B-3D), preferably has a guidance and positioning system 92 (see FIGS. 3B-3D), and preferably has a propulsion system 94 (see FIGS. 3B-3D) with one or more ion thrusters 96 (see FIGS. 3B-3D), or another suitable type of thruster, to maintain position and to provide maneuvering of the microsatellite 67. The wire orientation apparatus 66, such as the microsatellite 67, may also have additional suitable components.

The microsatellite 67 may also be referred to as a "microsat", a "small satellite", or a "smallsat". As used herein, "microsatellite" means an artificial satellite carried on the spacecraft and generally having a mass between 10 kg (ten kilograms) and 150 kg (one-hundred fifty kilograms), exclusive of maneuvering fuel or propellant material.

The wire orientation apparatus 66 (see FIG. 1), such as the first wire orientation apparatus 66a (see FIGS. 1, 3C), comprising the microsatellite 67 (see FIGS. 1, 3C), such as the first microsatellite 67a (see FIG. 3C), orients, or is configured to orient, the first wire 56 (see FIGS. 1, 3B), such as the positively-charged wire 56a (see FIGS. 1, 3C), or cable, in the first wire extended position 76 (see FIGS. 1, 3C), in an orientation 98 (see FIG. 1), such as a first wire orientation 98a (see FIGS. 1, 3C), where the first wire 56, such as the positively-charged wire 56a, or cable, is oriented in a direction 100 (see FIGS. 1, 3C), such as a first wire direction 100a (see FIG. 3C), toward, and in a parallel alignment 102 (see FIGS. 1, 3C) with, the approach path 28 (see FIGS. 1, 3C) of the approaching solar particles 24a (see FIGS. 1, 3C), for example, the protons 42 (see FIGS. 1, 3C).

The wire orientation apparatus 66, such as the first wire orientation apparatus 66a (see FIG. 1), comprising the microsatellite 67 (see FIGS. 1, 3C), such as the first microsatellite 67a (see FIG. 3C), further maintains, or is configured to maintain, the orientation 98, such as the first wire orientation 98a (see FIGS. 1, 3C), of the first wire 56, such as the positively-charged wire 56a, or cable, in the first wire extended position 76 (see FIG. 3C), at a predetermined distance 104 (see FIG. 1), such as a first wire predetermined distance 104a (see FIGS. 1, 3C), from the spacecraft 12, and in the direction 100, such as the first wire direction 100a (see FIGS. 1, 3C), toward the approaching solar particles 24a. The wire orientation apparatus 66, such as the first wire orientation apparatus 66a (see FIG. 1), comprising the microsatellite 67, such as the first microsatellite 67a (see FIG. 3C), further controls and maintains the tension 106 (see FIG. 1), such as the first wire tension 106a (see FIG. 1), of the first wire 56, such as the positively-charged wire 56a, or cable, in the first wire extended position 76. Thus, the wire orientation apparatus 66, such as the microsatellite 67, maneuvers, maintains the orientation 98, such as the first wire orientation 98a, or position of, and controls the tension 106, such as the first wire tension 106a, of the first wire 56, such as the positively-charged wire 56a, or cable.

The wire orientation apparatus 66 (see FIG. 1), such as the second wire orientation apparatus 66b (see FIGS. 1, 3D), comprising the microsatellite 67 (see FIGS. 1, 3D), such as the second microsatellite 67b (see FIG. 3D), orients, or is configured to orient, the second wire 60 (see FIGS. 1, 3D), such as the negatively-charged wire 60a (see FIGS. 1, 3D), or cable, in the second wire extended position 77 (see FIGS. 1, 3D), in an orientation 98 (see FIG. 1), such as a second wire orientation 98b (see FIGS. 1, 3D), where the second wire 60, such as the negatively-charged wire 60a, or cable, is oriented in a direction 100 (see FIGS. 1, 3D), such as a second wire direction 100b (see FIG. 3D), away from the approach path 28 (see FIGS. 1, 3C) of the approaching solar particles 24a (see FIGS. 1, 3C), for example, the protons 42 (see FIGS. 1, 3C), and in a direction 100 (see FIGS. 1, 3D), such as a second wire direction 100b (see FIGS. 1, 3D), opposite to the first wire direction 100a (see FIG. 3C) of the first wire 56. The wire orientation apparatus 66, such as the second wire orientation apparatus 66b (see FIG. 1), comprising the microsatellite 67 (see FIGS. 1, 3D), such as the second microsatellite 67b (see FIG. 3D), further maintains, or is configured to maintain, the orientation 98, such as the second wire orientation 98b (see FIGS. 1, 3D), of the second wire 60, such as the negatively-charged wire 60a, or cable, in the second wire extended position 77 (see FIG. 3D), at a predetermined distance 104 (see FIG. 1), such as a second wire predetermined distance 104b (see FIGS. 1, 3D), from the spacecraft 12, and in the direction 100, such as the second wire direction 100b (see FIGS. 1, 3D), away from the approaching solar particles 24a and in the second wire direction 100b (see FIG. 3D) opposite to the first wire direction 100a (see FIG. 3C). The wire orientation apparatus 66, such as the second wire orientation apparatus 66b (see FIG. 1), comprising the microsatellite 67 (see FIGS. 1, 3D), such as the second microsatellite 67b (see FIG. 3D), further controls and maintains the tension 106 (see FIG. 1), such as the second wire tension 106b (see FIG. 1), of the second wire 60, such as the negatively-charged wire 60a, or cable, in the second wire extended position 77 (see FIG. 3D). Thus, the wire orientation apparatus 66, such as the microsatellite 67, maneuvers, maintains the orientation 98, such as the second wire orientation 98b, or position of, and controls the tension 106, such as the second wire tension 106b, of the second wire 60, such as the negatively-charged wire 60a, or cable.

The first wire 56, such as the positively-charged wire 56a, in the form of the multi-strand wire 64, or cable, may be maintained in the orientation 98, such as the first wire orientation 98a (see FIG. 3C) by the wire orientation apparatus 66, such as the first wire orientation apparatus 66a (see FIG. 3C), comprising the microsatellite 67, such as the first microsatellite 67a (see FIG. 3C), with the one or more ion thrusters 96 (see FIG. 3C). Further, the wire orientation apparatus 66, such as the first wire orientation apparatus 66a (see FIG. 3C), comprising the microsatellite 67, such as the first microsatellite 67a (see FIG. 3C), may be controlled by the guidance and positioning system 92 (see FIG. 3C) and the propulsion system 94 (see FIG. 3C) during the solar wind 32 or the solar coronal mass ejection (CME) 36, to maintain the first wire orientation 98a and parallel alignment 102 of the first wire 56, such as in the form of the multi-strand wire 64, or cable, and to account for course correction maneuvers of the spacecraft 12. Preferably, the first wire 56, such as the positively-charged wire 56a, in the form of the multi-strand wire 64, or cable, is stable in the first wire extended position 76, without constant thrust by the wire orientation apparatus 66, such as the first wire orientation apparatus 66a (see FIG. 3C), comprising the microsatellite 67, such as the first microsatellite 67a (see FIG. 3C). When the first wire 56, such as the multi-strand wire 64, or cable, is charged, there may be electromagnetic force present, which the wire orientation apparatus 66, such as the first wire orientation apparatus 66a (see FIG. 3C), comprising the microsatellite 67, such as the first microsatellite 67a (see FIG. 3C), may preferably be able to counter during the solar wind 32 or the solar coronal mass ejection (CME) 36.

The second wire 60, such as the negatively-charged wire 60a, in the form of the multi-strand wire 64, or cable, may be maintained in the orientation 98, such as the second wire orientation 98b (see FIG. 3D) by the wire orientation apparatus 66, such as the second wire orientation apparatus 66b (see FIG. 3D), comprising the microsatellite 67, such as the second microsatellite 67b (see FIG. 3D), with the one or more ion thrusters 96 (see FIG. 3D). Further, the wire orientation apparatus 66, such as the second wire orientation apparatus 66b (see FIG. 3D), comprising the microsatellite 67, such as the second microsatellite 67b (see FIG. 3D), may be controlled by the guidance and positioning system 92 (see FIG. 3D) and the propulsion system 94 (see FIG. 3D) during the solar wind 32 or the solar coronal mass ejection (CME) 36, to maintain the second wire orientation 98b of the second wire 60, such as in the form of the multi-strand wire 64, or cable, and to account for course correction maneuvers of the spacecraft 12. Preferably, the second wire 60, such as in the negatively-charged wire 60a, in the form of the multi-strand wire 64, or cable, is stable in the second wire extended position 77, without constant thrust by the wire orientation apparatus 66, such as the second wire orientation apparatus 66b (see FIG. 3D), comprising the microsatellite 67, such as the second microsatellite 67b (see FIG. 3D). When the second wire 60, such as the negatively-charged wire 60a, in the form of the multi-strand wire 64, or cable, is charged, it acts as the counter-electrode 60b (see FIG. 1) to the positively-charged wire 56a.

When the approaching solar particles 24a travel in parallel, or substantially in parallel, alongside the positively-charged wire 56a toward the spacecraft 12, for a substantial fraction of the length 58 (see FIG. 1) of the positively-charged wire 56a, the charge on the positively-charged wire 56a deflects the approaching solar particles 24a, that are charged, away from the spacecraft 12, via electrostatic repulsion 108 (see FIG. 1), and the positively-charged wire 56a creates a radiation protection shielded region 110 (see FIG. 1) around the spacecraft 12 to protect against solar particle radiation 26 (see FIG. 1), and in particular, to protect any spacecraft occupants 20 (see FIG. 1) and spacecraft equipment 22 (see FIG. 1) from the solar particle radiation 26.

As the positively-charged wire 56a (see FIGS. 1, 3C) deflects the approaching solar particles 24a (see FIGS. 1, 3C) away from the spacecraft 12, the approaching solar particles 24a, such as the protons 42 (see FIGS. 1, 3C), diverge to follow new, divergent direction paths 29 (see FIGS. 2A, 3C) that are directed around and away from the spacecraft 12 (see FIGS. 1, 3C), when the approaching solar particles 24a travel alongside the positively-charged wire 56a toward the spacecraft 12 for a substantial fraction of the length 58 (see FIG. 1) of the first wire 56, such as the positively-charged wire 56a, to create the radiation protection shielded region 110 (see FIGS. 1, 2B, 3C) around the spacecraft 12, to protect the spacecraft 12 from the direct impact of solar particle radiation 26 (see FIGS. 1, 2B). In one example, as discussed below, the radiation protection shielded region 110 around the spacecraft 12 may have a 100 m (one hundred meter) diameter shielded region.

The positively-charged wire 56a (see FIGS. 1, 2B) creates a time-integrated lateral thrust 112 (see FIG. 1) on the approaching solar particles 24a (see FIGS. 1, 2B), such as the protons 42 (see FIGS. 1, 2B), as they initially travel in parallel alignment 102 (see FIGS. 1, 2B) with the positively-charged wire 56a. Integration time as the approaching solar particles 24a, such as the protons 42, travel in parallel alignment 102 with the positively-charged wire 56a provide an efficient deflection 114 (see FIG. 1) away from the radiation protection shielded region 110 around the spacecraft 12. Orienting one or more long, positively-charged wires 56a, such as in the form of multi-strand wires 64, or cables, toward the solar source 30 (see FIGS. 1, 2A) of the solar particles 24 (see FIGS. 1, 2A), such as the approaching solar particles 24a (see FIGS. 1, 2B), provides a way to deflect the approaching solar particles 24a, for example, the protons 42, such as high energy protons, at a low mass, low power, and low cost.

In another version, there is provided an oriented wire electrostatic radiation protection system 10 (see FIG. 1) for a ground-based installation 13 (see FIG. 1). The ground-based installation 13 (see FIG. 1) may include a manned installation or facility with one or more ground-based installation occupants 21 (see FIG. 1), an unmanned installation or facility, a ground-based habitat, a temporary or permanent-shelter or dwelling, or another suitable ground-based installation 13. The ground-based installation 13 is preferably installed on a non-Earth surface, for example, on the ground or surface of Mars, an asteroid, a moon of Earth, Mars, or another planet, or on another celestial body.

The oriented wire electrostatic radiation protection system 10 for the ground-based installation 13 comprises a wire management system 54 (see FIG. 1) operable to couple to the ground-based installation 13. The wire management system 54 comprises a first wire orientation apparatus 66a (see FIG. 1). The first wire orientation apparatus 66a comprises a microsatellite 67 (see FIG. 1) having a guidance and positioning system 92 (see FIG. 3B), and having a propulsion system 94 (see FIG. 3B) with one or more ion thrusters 96 (see FIG. 3B. The wire management system 54 further comprises a first wire 56 (see FIG. 1) coupled to the wire management system 54. The wire management system 54 deploys the first wire 56 from a first wire stowed position 74 (see FIG. 1) to a first wire extended position 76 (see FIG. 1), and the first wire orientation apparatus 66a orients the first wire 56 in the first wire extended position 76 in a first wire orientation 98a (see FIG. 1), where the first wire 56 is oriented in a first wire direction 100a (see FIG. 1) toward, and in a parallel alignment 102 (see FIG. 1) with, an approach path 28 (see FIG. 1) of approaching solar particles 24a (see FIG. 1). The first wire orientation apparatus 66a further maintains the first wire orientation 98a of the first wire 56 at a first wire predetermined distance 104a (see FIG. 1) from the ground-based installation 13. The first wire 56 comprises a multi-strand wire 64 (see FIG. 1) having a plurality of bonded portions 65 (see FIG. 1). The first wire 56 is preferably comprised of one or more conductive metal materials 90 (see FIG. 1). A length 58 (see FIG. 1) of the first wire 56 is preferably in a range of from 1000 meters to 5000 meters. A diameter 59 (see FIG. 1) of the first wire 56 is preferably in a range of from 0.5 millimeters to 2.0 millimeters.

The wire management system 54 may further comprise one or more wire management assemblies 55. Each of the one or more wire management assemblies 55 comprise a spooling apparatus 72 (see FIG. 1), a deployment apparatus 78 (see FIG. 1) coupled to the spooling apparatus 72, one or more motors 80 (see FIG. 1) coupled to the spooling apparatus 72, to drive the spooling apparatus 72, and a controller 82 (see FIG. 1) and a control interface 84 (see FIG. 1) of the control system 70 (see FIG. 1). The control interface 84 is coupled to the controller 82, and the controller 82 is coupled to the spooling apparatus 72, via the one or more motors 80, and is coupled to the deployment apparatus 78. The controller 82 controls operation of the spooling apparatus 72 and the deployment apparatus 78.

The oriented wire electrostatic radiation protection system 10 for the ground-based installation 13 further comprises a power supply 68 (see FIG. 1) having a power supply first portion 68a (see FIG. 1) coupled to the first wire 56. The power supply first portion 68a charges the first wire 56, to obtain a positively-charged wire 56a (see FIG. 1). The oriented wire electrostatic radiation protection system 10 for the ground-based installation 13 further comprises a control system 70 (see FIG. 1) for controlling operation of the oriented wire electrostatic radiation protection system 10. When the approaching solar particles 24a travel in parallel and alongside the positively-charged wire 56a toward the ground-based installation 13, the positively-charged wire 56a deflects the approaching solar particles 24a away from the ground-based installation 13, via electrostatic repulsion 108 (see FIG. 1), and the positively-charged wire 56a creates a radiation protection shielded region 110 (see FIG. 1) around the ground-based installation 13. The approaching solar particles 24a originate from a solar source 30 (see FIG. 1) comprising one or more of, a solar wind 32 (see FIG. 1), and a solar coronal mass ejection (CME) 36 (see FIG. 1).

The oriented wire electrostatic radiation protection system 10 for the ground-based installation 13 may optionally include a second wire orientation apparatus 66b (see FIG. 1) and a second wire 60 (see FIG. 1) coupled to the wire management system 54. The second wire orientation apparatus 66b comprise a microsatellite 67 (see FIG. 1) having the guidance and positioning system 92 (see FIG. 3D), and having the propulsion system 94 (see FIG. 3D) with one or more ion thrusters 96 (see FIG. 3D). The wire management system 54 deploys the second wire 60 from a second wire stowed position 75 (see FIG. 1) to a second wire extended position 77 (see FIG. 1), and the second wire orientation apparatus 66b orients the second wire 60 in the second wire extended position 77 in a second wire orientation 98b (see FIG. 1), where the second wire 60 is oriented in a second wire direction 100b (see FIG. 1) opposite to the first wire direction 100a and away from the approach path 28 of the approaching solar particles 24a. The second wire orientation apparatus 66b further maintains the second wire orientation 98b of the second wire 60 at a second wire predetermined distance 104b (see FIG. 1) from the ground-based installation 13. If a second wire 60 is used, the power supply 68 has a power supply second portion 68b (see FIG. 1) coupled to the second wire 60. The power supply second portion 68b charges the second wire 60, to obtain a negatively-charged wire 60a (see FIG. 1). The negatively-charged wire 60a maintains a charge balance 51 (see FIG. 1) at a ground-based installation position, if the second wire 60 is used. The second wire 60 comprise a multi-strand wire 64 (see FIG. 1) having a plurality of bonded portions 65 (see FIG. 1). The second wire 60 is preferably comprised of one or more conductive metal materials 90 (see FIG. 1). A length 62 (see FIG. 1) of the second wire 60 is preferably in a range of from 1000 meters to 5000 meters. A diameter 63 (see FIG. 1) of the second wire 60 is preferably in a range of from 0.5 millimeters to 2.0 millimeters.

Now referring to FIGS. 2A-2B, FIG. 2A is an illustration of a schematic diagram showing an environmental view of a spacecraft 12, such as an interplanetary spacecraft 12a, in space 16 with solar particles 24 approaching from a solar source 30, such as a solar coronal mass ejection (CME) 36 associated with a solar flare 38 at the Sun 30a. FIG. 2B is an illustration of an enlarged view of circle 2B of FIG. 2A, showing an exemplary version of the oriented wire electrostatic radiation protection system 10 with the first wire 56, such as the positively-charged wire 56a, in the first wire extended position 76 deflecting solar particles 24, such as approaching solar particles 24a, and with the second wire 60, such as the negatively-charged wire 60a, in the second wire extended position 77.

FIG. 2A shows the interplanetary magnetic field lines 120 between the Sun 30a and the spacecraft 12. FIG. 2A further shows the solar particles 24 released by the solar CME 36 that travel along the approach path 28 toward the spacecraft 12. FIG. 2A further shows the first wire 56, such as the positively-charged wire 56a, extended between the spacecraft 12 and the wire orientation apparatus 66, such as the first wire orientation apparatus 66a. FIG. 2A further shows the second wire 60, such as the negatively-charged wire 60a, extended between the spacecraft 12 and the wire orientation apparatus 66, such as the second wire orientation apparatus 66b, opposite the first wire 56 and the first wire orientation apparatus 66a. The wire orientation apparatus 66 (see FIG. 2A), such as the first wire orientation apparatus 66a (see FIG. 2A), maintains the first wire 56 (see FIG. 2A), such as the positively-charged wire 56a (see FIG. 2A), in the first wire extended position 76 (see FIG. 2B), toward the approaching solar particles 24a (see FIG. 2A), at an angle 118 (see FIG. 2A) from the Sun 30a (see FIG. 2A), and in a non-limiting example, at about a fifty-degree (50°) angle from the Sun 30a, at or near the orbital radius of the Earth 18a (see FIG. 1) around the Sun 30a. As the positively-charged wire 56a (see FIG. 2A) deflects the approaching solar particles 24a (see FIG. 2A) away from the spacecraft 12 (see FIG. 2A), the approaching solar particles 24a diverge to follow new, divergent direction paths 29 (see FIG.

2A) that are directed around and away from the spacecraft 12, creating the radiation protection shielded region 110 (see FIG. 2B).

FIG. 2B shows the spacecraft 12, such as the interplanetary spacecraft 12a, of FIG. 2A, in a spacecraft position 52, with the oriented wire electrostatic radiation protection system 10 comprising the wire management system 54, the first wire 56, such as the positively-charged wire 56a, and the second wire 60, such as the negatively-charged wire 60a. As shown in FIG. 2B, the wire orientation apparatus 66, such as the first wire orientation apparatus 66a, has oriented the positively-charged wire 56a in the first wire extended position 76, in the orientation 98, such as the first wire orientation 98a in the direction 100, such as the first wire direction 100a, toward, and in a parallel alignment 102 with, the solar particles 24, such as the approaching solar particles 24a, for example, the protons 42. As further shown in FIG. 2B, the wire orientation apparatus 66, such as the first wire orientation apparatus 66a, maintains the first wire orientation 98a of the positively-charged wire 56a, in the first wire extended position 76, at the first wire predetermined distance 104a from the spacecraft 12. As further shown in FIG. 2B, the first wire 56, such as the positively-charged wire 56a deflects the protons 42 of the approaching solar particles 24a away from the spacecraft 12 and creates the radiation protection shielded region 110 around the spacecraft 12 to protect the spacecraft 12 from and against the direct impact of solar particle radiation 26.

As further shown in FIG. 2B, the wire orientation apparatus 66, such as the second wire orientation apparatus 66b, has oriented the negatively-charged wire 60a in the second wire extended position 77, in the orientation 98, such as the second wire orientation 98b, in the direction 100, such as the second wire direction 100b, away from the solar particles 24, such as the approaching solar particles 24a, and the second wire direction 100b is opposite to the first wire direction 110a. As further shown in FIG. 2B, the wire orientation apparatus 66, such as the second wire orientation apparatus 66b, maintains the second wire orientation 98b of the negatively-charged wire 60a, in the second wire extended position 77, at the second wire predetermined distance 104b from the spacecraft 12. The second wire 60, such as the negatively-charged wire 60a, counters the charge of the positively-charged wire 56a and maintains a charge balance 51 (see FIG. 2B) around the spacecraft 12.

Now referring to FIGS. 3A-3D, which are not necessarily drawn to scale, FIG. 3A is an illustration of a schematic diagram showing a top cut-away view of an exemplary version of the oriented wire electrostatic radiation protection system 10 of the disclosure, coupled to, or installed in, a spacecraft 12, such as a manned spacecraft 12b, with spacecraft occupants 20, such as astronauts, inside the spacecraft 12. As shown in FIG. 3A, the spacecraft 12 includes spacecraft equipment 22, such as electronic equipment, for example, computers or controls, and includes solar particle detector devices 50 coupled to the exterior of the spacecraft 12.

As further shown in FIG. 3A, the oriented wire electrostatic radiation protection system 10 may be housed within one or more enclosed portions 86, for example, such as a first enclosed portion 86a and a second enclosed portion 86b, in the spacecraft 12. The enclosed portion 86 (see FIG. 3A), such as the first enclosed portion 86a (see FIG. 3A), may be sealed or air-locked, and may be in communication with, or connected to, a first exterior access door 88a (see FIG. 3A) of the spacecraft 12. The first exterior access door 88a (see FIG. 3A) may be opened and closed for deployment and retraction of the first wire orientation apparatus 66a (see FIGS. 1, 3B), such as a first microsatellite 67a (see FIG. 3B) and the first wire 56 (see FIGS. 3A-3B), such as the positively-charged wire 56a (see FIGS. 3A-3B), attached to the first wire orientation apparatus 66a. As further shown in FIG. 3A, a wire management system 54 is housed within the first enclosed portion 86a, and the first wire 56 is in the first wire stowed position 74, such as the first wire spooled position 74a.

The enclosed portion 86 (see FIG. 3A), such as the second enclosed portion 86b (see FIG. 3A), may be sealed or air-locked, and may be in communication with, or connected to, a second exterior access door 88b (see FIG. 3A) of the spacecraft 12. The second exterior access door 88b (see FIG. 3A) may be opened and closed for deployment and retraction of the second wire orientation apparatus 66b (see FIGS. 1, 3D), such as a second microsatellite 67b (see FIG. 3D) and the second wire 60 (see FIGS. 3A, 3D), such as the negatively-charged wire 60a (see FIGS. 3A, 3D), attached to the second wire orientation apparatus 66b. As further shown in FIG. 3A, a wire management system 54 is also housed within the second enclosed portion 86b, and the second wire 60 is in the second wire stowed position 75, such as the second wire spooled position 75a.

The wire management assembly 55 (see FIGS. 1, 3B), such as the first wire management assembly 55a (see FIGS. 3A-3B), the first wire 56 (see FIGS. 1, 3A-3B), the first wire orientation apparatus 66a (see FIGS. 1, 3B), the power supply first portion 68a (see FIGS. 1, 3B), the first controller 82a (see FIG. 3B), and the first control interface 84a (see FIG. 3B), may be coupled within or to the spacecraft 12, such as coupled within, or to, the enclosed portion 86 (see FIGS. 3A-3B), such as the first enclosed portion 86a (see FIGS. 3A-3B), within the spacecraft 12. The enclosed portion 86, such as the first enclosed portion 86a, preferably houses the first wire management assembly 55a, the first wire 56, the first wire orientation apparatus 66a, the power supply first portion 68a, the first controller 82a, and the first control interface 84a. Alternatively, the enclosed portion 86, such as the first enclosed portion 86a, may house the first wire management assembly 55a, the first wire 56, and the first wire orientation apparatus 66a, and one or more of, the power supply first portion 68a, the first controller 82a, and the first control interface 84a may be located outside the first enclosed portion 86a, but still have inside the first enclosed portion 86a connections to the first wire management assembly 55a and the first wire orientation apparatus 66a.

As shown in FIG. 3A, the spacecraft 12 may have a first exterior access door 88a, or another type of access or portal, in communication with the first enclosed portion 86a. The first exterior access door 88a (see FIG. 3A) may be opened and closed to allow the first wire 56 (see FIG. 3A), such as in the form of the multi-strand wire 64, or cable, and the first wire orientation apparatus 66a (see FIG. 3B) to be deployed from and out of the spacecraft 12, and to be retracted back into and stowed within the spacecraft 12.

The wire management assembly 55 (see FIGS. 1, 3D), such as the second wire management assembly 55b (see FIG. 3A), the second wire 60 (see FIGS. 1, 3A), the second wire orientation apparatus 66b (see FIGS. 1, 3D), the power supply second portion 68b (see FIGS. 1, 3D), the second controller 82b (see FIG. 3D), and the second control interface 84b (see FIG. 3D), may be coupled within or to the spacecraft 12, such as coupled within or to an enclosed portion 86 (see FIG. 3A), such as a second enclosed portion 86b (see FIG. 3A), within the spacecraft 12. The enclosed portion 86 (see FIG. 3A), such as the second enclosed portion 86b (see FIG. 3A), preferably houses the second wire management assembly 55b (see FIG. 3A), the second wire 60 (see FIG. 3A), the second wire orientation apparatus 66b (see FIG. 3D), the power supply second portion 68b (see FIG. 3D), the second controller 82b (see FIG. 3D), and the second control interface 84b (see FIG. 3D). Alternatively, the enclosed portion 86, such as the second enclosed portion 86b, may house the second wire management assembly 55b, the second wire 60, and the second wire orientation apparatus 66b, and one or more of the power supply second portion 68b, the second controller 82b, and the second control interface 84b may be located outside the second enclosed portion 86b, but still have inside the second enclosed portion 86b connections to the second wire management assembly 55b and the second wire orientation apparatus 66b.

As shown in FIG. 3A, the spacecraft 12 may have a second exterior access door 88b, or another type of access or portal, in communication with the second enclosed portion 86b. The second exterior access door 88b (see FIG. 3A) may be opened and closed to allow the second wire 60 (see FIG. 3A), such as in the form of the multi-strand wire 64, or cable, and the second wire orientation apparatus 66b (see FIG. 3D) to be deployed from and out of the spacecraft 12 (see FIG. 3A), and to be retracted back into and stowed within the spacecraft 12.

The location and positioning of the oriented wire electrostatic radiation protection system 10 in the spacecraft 12 is not limited to that shown in FIG. 3A, and the oriented wire electrostatic radiation protection system 10 may be located in another suitable area or location in the spacecraft 12. The first exterior access door 88a (see FIG. 3A) and the second exterior access door 88b (see FIG. 3A) may provide an effective seal to contain the pressure of the air inside the spacecraft 12 (see FIG. 3A), allowing the spacecraft occupants 20 (see FIG. 3A) to perform any repairs on the oriented wire electrostatic radiation protection system 10 (see FIG. 3A), to change to a new spool of wire, or to perform any other maintenance or repair operations.

Now referring to FIG. 3B, FIG. 3B is an illustration of an enlarged view of circle 3B of FIG. 3A, showing the oriented wire electrostatic radiation protection system 10 with the wire management system 54 having a wire management assembly 55, such as a first wire management assembly 55a, and a first wire 56, such as in the form of multi-strand wire 64, in the first wire stowed position 74, such as the first wire spooled position 74a. FIG. 3B shows the oriented wire electrostatic radiation protection system 10 substantially housed within the enclosed portion 86, such as the first enclosed portion 86a, in the spacecraft 12, such as the manned spacecraft 12b. FIG. 3B shows the wire management system 54 coupled to a portion 12d of the spacecraft 12.

FIG. 3B further shows the spooling apparatus 72, such as the first spooling apparatus 72a, for example, in the form of spool 73, of the wire management assembly 55, such as the first wire management assembly 55a, holding the first wire 56, such as the multi-strand wire 64, in the first wire stowed position 74, such as the first wire spooled position 74a. FIG. 3B further shows the deployment apparatus 78, such as the first deployment apparatus 78a, for example, in the form of a launch device 79, of the wire management assembly 55, coupled to the spooling apparatus 72. A motor 80 (see FIG. 3B), such as first motor 80a, may be coupled to the spooling apparatus 72 (see FIG. 3B), via a fifth connection 85e (see FIG. 3B), such as a wired connection.

FIG. 3B further shows the wire orientation apparatus 66, such as the first wire orientation apparatus 66a, for example, in the form of microsatellite 67, such as first microsatellite 67a, having the guidance and positioning system 92, and the propulsion system 94 with one or more ion thrusters 96. The wire orientation apparatus 66 (see FIG. 3B), such as the first wire orientation apparatus 66a, is attached to the first wire 56 (see FIG. 3B). FIG. 3B further shows the power supply first portion 68a of the power supply 68, for example, in the form of a high voltage power supply 68c (see FIG. 1), coupled to the first wire 56, via a sixth connection 85f.

FIG. 3B further shows the control system 70, such as a first control system 70a, for controlling operation of the oriented wire electrostatic radiation protection system 10, where the control system 70, such as the first control system 70a, may at least comprise the controller 82, such as the first controller 82a, and the control interface 84, such as the first control interface 84a. The control interface 84, such as the first control interface 84a, is coupled to the controller 82, such as the first controller 82a, via the first connection 85a (see FIG. 3B), such as a wired connection. The controller 82, such as the first controller 82a, is coupled to the power supply first portion 68a of the power supply 68, via a second connection 85b (see FIG. 3B). The controller 82, such as the first controller 82a, is further coupled to the motor 80, such as the first motor 80a, via a third connection 85c, and the controller 82, such as the first controller 82a, is further coupled to the deployment apparatus 78, such as the first deployment apparatus 78a, via a fourth connection 85d. FIG. 3B further shows the first exterior access door 88a for deployment and retraction of the wire orientation apparatus 66, such as the first wire orientation apparatus 66a, for example, in the form of microsatellite 67, such as first microsatellite 67a, and further shows the attached first wire 56 into and out of the spacecraft 12.

Now referring to FIG. 3C, FIG. 3C is an illustration of a schematic diagram showing a close-up, top cut-away view of the oriented wire electrostatic radiation protection system 10 of FIG. 3B with the wire management system 54 and the first wire 56, such as the positively-charged wire 56a, in the form of multi-strand wire 64, in the first wire extended position 76, such as the first wire unspooled position 76a. FIG. 3C shows the oriented wire electrostatic radiation protection system 10 substantially housed within the enclosed portion 86, such as the first enclosed portion 86a, in the spacecraft 12, such as the manned spacecraft 12b, and shows the wire orientation apparatus 66, such as the first wire orientation apparatus 66a, for example, in the form of microsatellite 67, such as first microsatellite 67a, and the positively-charged wire 56a deployed and extended out through the first exterior access door 88a of the spacecraft 12 into space 16.

FIG. 3C further shows the first end 57a of the positively-charged wire 56a attached to the spooling apparatus 72, such as the first spooling apparatus 72a, in the form of spool 73, of the wire management assembly 55, such as the first wire management assembly 55a. FIG. 3C further shows the second end 57b of the positively-charged wire 56a attached to the first wire orientation apparatus 66a, and shows the length 58 of the positively-charged wire 56a in the first wire extended position 76. FIG. 3C further shows the guidance and positioning system 92, and the propulsion system 94 with one or more ion thrusters 96 of the first wire orientation apparatus 66a, such as the first microsatellite 67a.

FIG. 3C further shows the wire management assembly 55, such as the first wire management assembly 55a, comprising the deployment apparatus 78, such as the first deployment apparatus 78a, for example, in the form of launch device 79, coupled to the spooling apparatus 72, such as the first spooling apparatus 72a. FIG. 3C further shows the motor 80, such as the first motor 80a, coupled to the spooling apparatus 72, such as the first spooling apparatus 72a, via the fifth connection 85e. FIG. 3C further shows the power supply first portion 68a of the power supply 68, coupled to the first wire 56, such as the positively-charged wire 56a, via the sixth connection 85f.

FIG. 3C further shows the controller 82, such as the first controller 82a, and the control interface 84, such as the first control interface 84a, of the control system 70, such as the first control system 70a. FIG. 3C further shows the control interface 84, such as the first control interface 84a, coupled to the controller 82, such as the first controller 82a, via the first connection 85a. FIG. 3C further shows the controller 82, such as the first controller 82a, coupled to the power supply first portion 68a of the power supply 68, via the second connection 85b. FIG. 3C further shows the controller 82, such as the first controller 82a, coupled to the motor 80, such as the first motor 80a, via the third connection 85c, and shows the controller 82, such as the first controller 82a, coupled to the deployment apparatus 78, such as the first deployment apparatus 78a, via the fourth connection 85d.

As shown in FIG. 3C, the first wire orientation apparatus 66a orients the positively-charged wire 56a in the first wire extended position 76, in the first wire orientation 98a, where the positively-charged wire 56a is oriented in the direction 100, such as the first wire direction 100a, toward, and in parallel alignment 102 with, the approach path 28 of the solar particles 24, such as the approaching solar particles 24a, for example, in the form of high energy solar particles 24b. As further shown in FIG. 3C, the first wire orientation apparatus 66a maintains the first wire orientation 98a of the positively-charged wire 56a in the first wire extended position 76, at the first wire predetermined distance 104a, from the spacecraft 12, and in the first wire direction 100a toward the approaching solar particles 24a.

When the solar particles 24 (see FIG. 3C), such as the approaching solar particles 24a (see FIG. 3C), travel alongside the positively-charged wire 56a (see FIG. 3C), such as in the form of the multi-strand wire 64 (see FIG. 3C), toward the spacecraft 12 (see FIG. 3C), the positively-charged wire 56a deflects the solar particles 24, such as the approaching solar particles 24a, for example, the protons 42 (see FIG. 3C), in new, divergent direction paths 29 (see FIG. 3C) around and away from the spacecraft 12, via electrostatic repulsion 108 (see FIG. 3C), and the positively-charged wire 56a creates the radiation protection shielded region 110 (see FIG. 3C) around the spacecraft 12 to protect against the direct impact of solar particle radiation 26 (see FIG. 3C), and in particular, to protect the spacecraft occupants 20 (see FIG. 3A) and spacecraft equipment 22 (see FIG. 3A) from the solar particle radiation 26. As the positively-charged wire 56a deflects the solar particles 24, such as the approaching solar particles 24a, around and away from the spacecraft 12, the solar particles 24, such as the approaching solar particles 24a, for example, the protons 42, diverge to follow divergent direction paths 29 (see FIG. 3C) that are directed around and away from the spacecraft 12 (see FIG. 3C), creating the radiation protection shielded region 110 (see FIG. 3C).

Now referring to FIG. 3D, FIG. 3D is an illustration of a schematic diagram showing a close-up, top cut-away view of the oriented wire electrostatic radiation protection system 10 of FIG. 3A with the wire management system 54, and the second wire 60, such as the negatively-charged wire 60a, in the second wire extended position 77, such as the second wire unspooled position 77a. FIG. 3D shows the oriented wire electrostatic radiation protection system 10 substantially housed within the enclosed portion 86, such as the second enclosed portion 86b, in the spacecraft 12, such as the manned spacecraft 12b, and shows the wire orientation apparatus 66, such as the second wire orientation apparatus 66b, for example, in the form of microsatellite 67, such as second microsatellite 67b, and the negatively-charged wire 60a deployed and extended out through the second exterior access door 88b of the spacecraft 12 into space 16.

FIG. 3D further shows the first end 61a of the negatively-charged wire 60a attached to the spooling apparatus 72, such as the second spooling apparatus 72b, in the form of spool 73, of the wire management assembly 55, such as the second wire management assembly 55b. FIG. 3D further shows the second end 61b of the negatively-charged wire 60a attached to the second wire orientation apparatus 66b, and shows the length 62 of the negatively-charged wire 60a in the second wire extended position 77. FIG. 3D further shows the guidance and positioning system 92, and the propulsion system 94 with one or more ion thrusters 96 of the second wire orientation apparatus 66b, such as the second microsatellite 67b.

FIG. 3D further shows the wire management assembly 55, such as the second wire management assembly 55b, comprising the deployment apparatus 78, such as the second deployment apparatus 78b, for example, in the form of launch device 79, coupled to the spooling apparatus 72. FIG. 3D further shows the motor 80, such as the second motor 80b, coupled to the spooling apparatus 72, such as the second spooling apparatus 72b, via the fifth connection 85e, and shows the power supply second portion 68b of the power supply 68, coupled to the second wire 60, such as the negatively-charged wire 60a, via the sixth connection 85f.

FIG. 3D further shows the controller 82, such as the second controller 82b, and the control interface 84, such as the second control interface 84b, of the control system 70, such as the second control system 70b. FIG. 3D further shows the control interface 84, such as the second control interface 84b, coupled to the controller 82, such as the second controller 82b, via the first connection 85a. FIG. 3D further shows the controller 82, such as the second controller 82b, coupled to the power supply second portion 68b of the power supply 68, via the second connection 85b. FIG. 3D further shows the controller 82, such as the second controller 82b, coupled to the motor 80, such as the second motor 80b, via the third connection 85c, and shows the controller 82, such as the second controller 82b, coupled to the deployment apparatus 78, such as the second deployment apparatus 78b, via the fourth connection 85d.

As shown in FIG. 3D, the second wire orientation apparatus 66b, for example, in the form of second microsatellite 67b, orients the negatively-charged wire 60a in the second wire extended position 77, in the second wire orientation 98b, where the negatively-charged wire 60a is oriented in the direction 100, such as the second wire direction 100b, away from the spacecraft 12, and in the opposite direction to the positively-charged wire 56a (see FIG. 3C), and in the opposite direction to the approach path 28 (see FIG. 3C) of the approaching solar particles 24a (see FIG. 3C), such as high energy solar particles 24b (see FIG. 3C). As further shown in FIG. 3D, the second wire orientation apparatus 66b maintains the second wire orientation 98b of the negatively-charged wire 60a in the second wire extended position 77, such as the second wire unspooled position 77a, at the second wire predetermined distance 104b, away from the spacecraft 12, and in the direction 100, such as the second wire direction 100b.

Figure 3E:
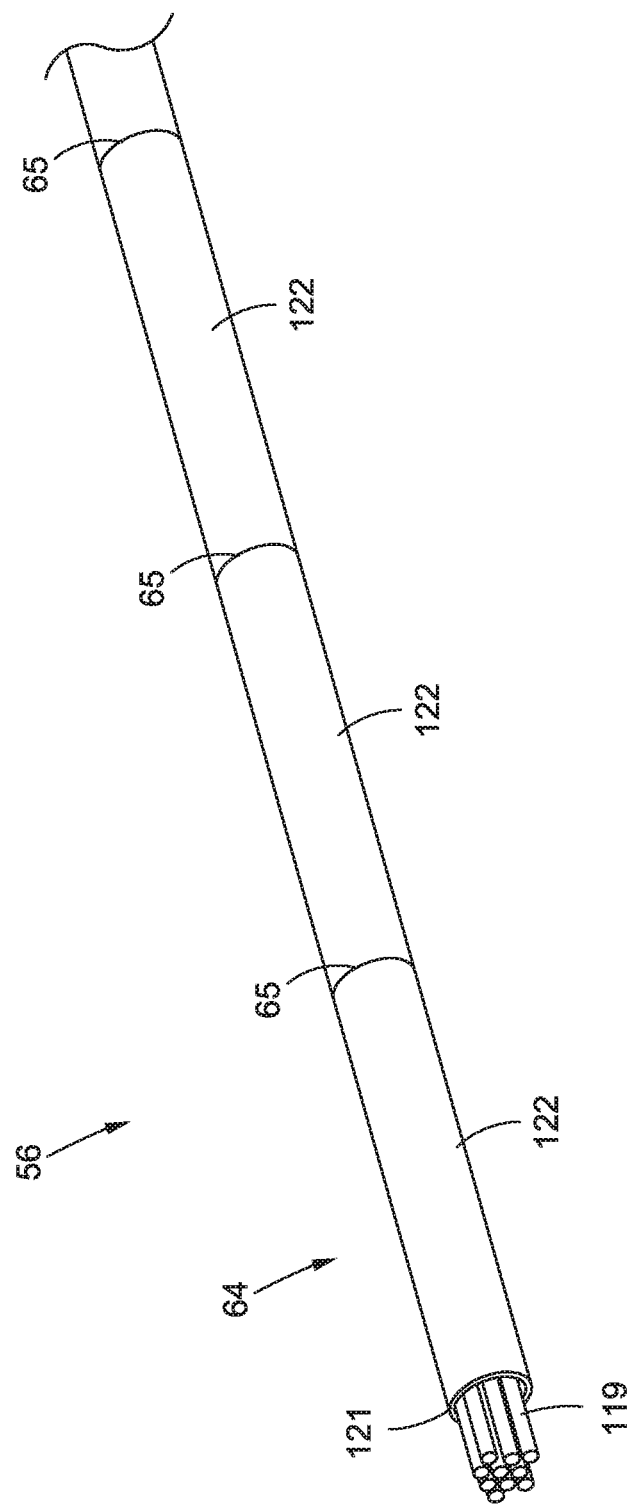
FIG. 3E is an illustration of an enlarged perspective view of a multi-strand wire that may be used in the oriented wire electrostatic radiation protection system of the disclosure.

Now referring to FIG. 3E, FIG. 3E is an illustration of an enlarged perspective view of a version of the first wire 56, such as in the form of a multi-strand wire 64, that may be used in the oriented wire electrostatic radiation protection system 10 (see FIGS. 1, 3A) of the disclosure. As shown in FIG. 3E, the multi-strand wire 64 may comprise bonded portions 65 that may be periodically or evenly spaced, e.g., length intervals of 20 cm (20 centimeters), or the like, along the multi-strand wire 64, for example, along the length 58 (see FIGS. 1, 3C) of the first wire 56, and along the length 62 of the second wire 60, to physically attach each of the wire strands 119 of the multi-strand wire 64 to each other, so that in the event of damage from one or more of, abrasion, over flexure, impact of micro-meteorites, and sputtering from impact of high energy electrons or particles, the loss of strength may be limited to wire segments 122 (see FIG. 3E) between the bonded portions 65 (see FIG. 3E). The multi-strand wire 64 (see FIG. 3E) may be bonded together periodically with one or more of, a polymer adhesive, a solder, a weld, a banding, tight twists, or another suitable bonding process or device. The multi-strand wire 64 is preferably periodically bonded with bonded portions 65, to limit the effects of individual strand or wire segment 122 breakage.

Figure 4:
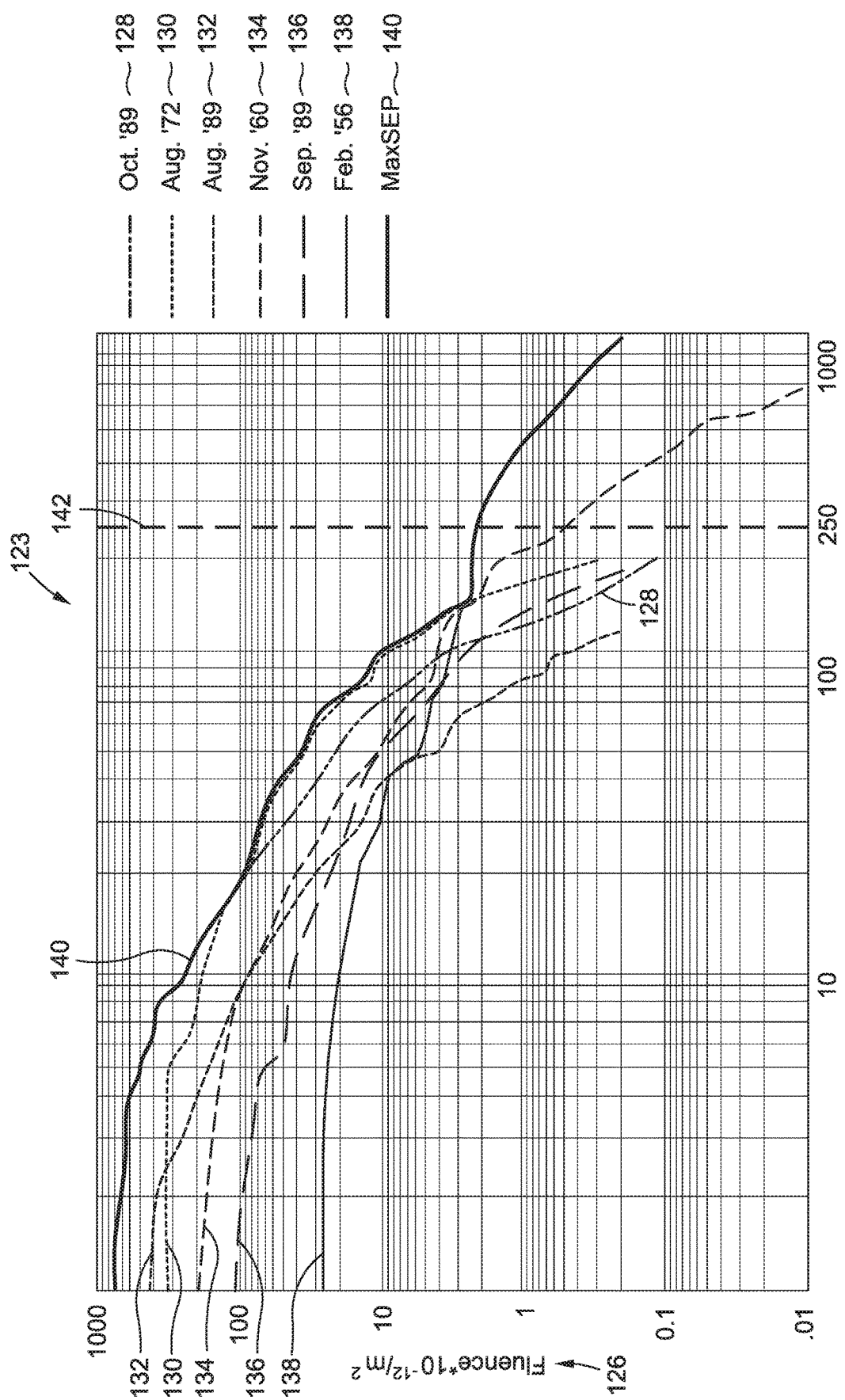
FIG. 4 is an illustration of a graph showing a relationship between particle energy and fluence of known solar particle events.

Now referring to FIG. 4, FIG. 4 is an illustration of a graph 123 showing a relationship between particle energy 124 and fluence 126 of known solar particle events that occurred and were measured by spacecraft. As shown in FIG. 4, the graph 123 includes particle energy 124 in megaelectron volts (MeV) along the x-axis and fluence 126 in $*10^{-12}/m^2$ along the y-axis. The graph 123 in FIG. 4 further shows the plots of ion distributions of particle energy 124 of several known solar particle events including, an October 1989 solar particle event plot 128, an August 1972 solar particle event plot 130, an August 1989 solar particle event plot 132, a November 1960 solar particle event plot 134, a September 1989 solar particle event plot 136, and a February 1956 solar particle event plot 138. The graph 123 in FIG. 4 further shows a maximum solar energetic particle (MaxSEP) plot 140. The graph 123 (see FIG. 4) further shows a 250 MeV (two hundred fifty megaelectron volt) threshold 142 for deflection voltage 116 (see FIG. 1) of solar particles 24 (see FIG. 1), such as protons 42 (see FIG. 1), under 250 MeV. For example, the oriented wire electrostatic radiation protection system 10 (see FIGS. 1-3C) having a positively-charged wire 56a (see FIGS. 1, 3C) with a length 58 (see FIG. 1) of 1500 meters (1.5 kilometers) and charged at 17 MV (seventeen megavolts), may deflect solar particles 24 (see FIG. 1), such as protons 42 (see FIG. 1), with energy less than 250 MeV, to provide a radiation protection shielded region 110 (see FIGS. 1, 3C) that may comprise a circular 100 m (one hundred meter) protected zone around the spacecraft 12 (see FIGS. 1, 3C) with a mass of the oriented wire electrostatic radiation protection system 10 of about 150 kg (one-hundred fifty kilograms) and less than 100 W (one hundred watts). Other system parameters may be configured to increase or decrease the limiting threshold for protection. In contrast, with known physical shielding materials for a spacecraft to shield against protons under 250 MeV, it may, for example, require a disk-shaped polyethylene shield (13 inches thick) that at 30 g/cm² (thirty grams per square centimeter) for a 10 m (ten meter) by 50 m (fifty meter) spacecraft, has a mass of about 23,000 kg (twenty-three thousand kilograms).

Figure 5:
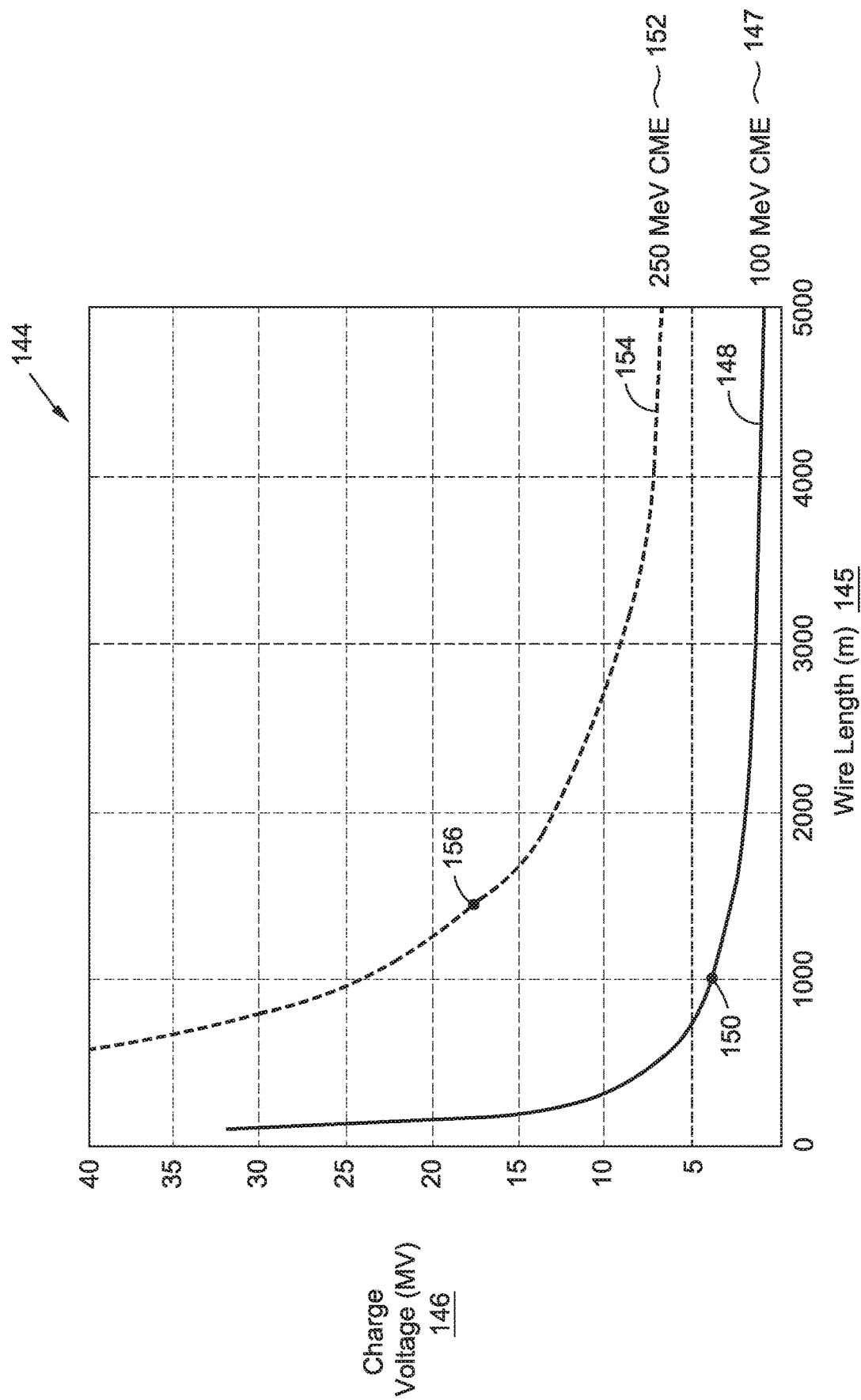
FIG. 5 is an illustration of a graph showing a relationship between wire length and charge voltage necessary to deflect particles with 250 MeV and 100 MeV of energy, developed using a multiphysics simulation modeling software.

Now referring to FIG. 5, FIG. 5 is an illustration of a graph 144 showing a relationship between wire length 145 and charge voltage 146 necessary to deflect particles with 250 MeV (two-hundred fifty megaelectron volts) and 100 MeV (one hundred megaelectron volts) of energy developed using a multiphysics simulation modeling software. As shown in FIG. 5, the graph 144 includes wire length 145 in meters (m), of, for example, the first wire 56 (see FIG. 1), such as the positively-charged wire 56a (see FIGS. 1, 3C), along the x-axis and charge voltage 146 in megavolts (MV) along the y-axis. The graph 144 in FIG. 5 further shows a plot 148 for a 100 MeV solar coronal mass ejection (CME) 147. For example, the radiation protection shielded region 110 (see FIGS. 1, 3C) comprising a circular 100 m (one hundred meter) protected zone around a spacecraft 12 (see FIGS. 1, 3C) shielded from 100 MeV protons may have a 4 MV (four megavolts) charge for a wire length 145 of 1000 m (one thousand meters or 1 km (one kilometer)), which is represented by plot point measurement 150. The graph 144 in FIG. 5 further shows a plot 154 for a 250 MeV solar coronal mass ejection (CME) 152. For example, the radiation protection shielded region 110 (see FIGS. 1, 3C) comprising a circular 100 m (one hundred meter) protected zone around a spacecraft 12 (see FIGS. 1, 3C) shielded from 250 MeV protons may have a 17 MV (seventeen megavolts) charge for a wire length 145 of 1500 m (one thousand five hundred meters or 1.5 km (one and a half kilometers)), which is represented by plot point measurement 156.

Figure 6:
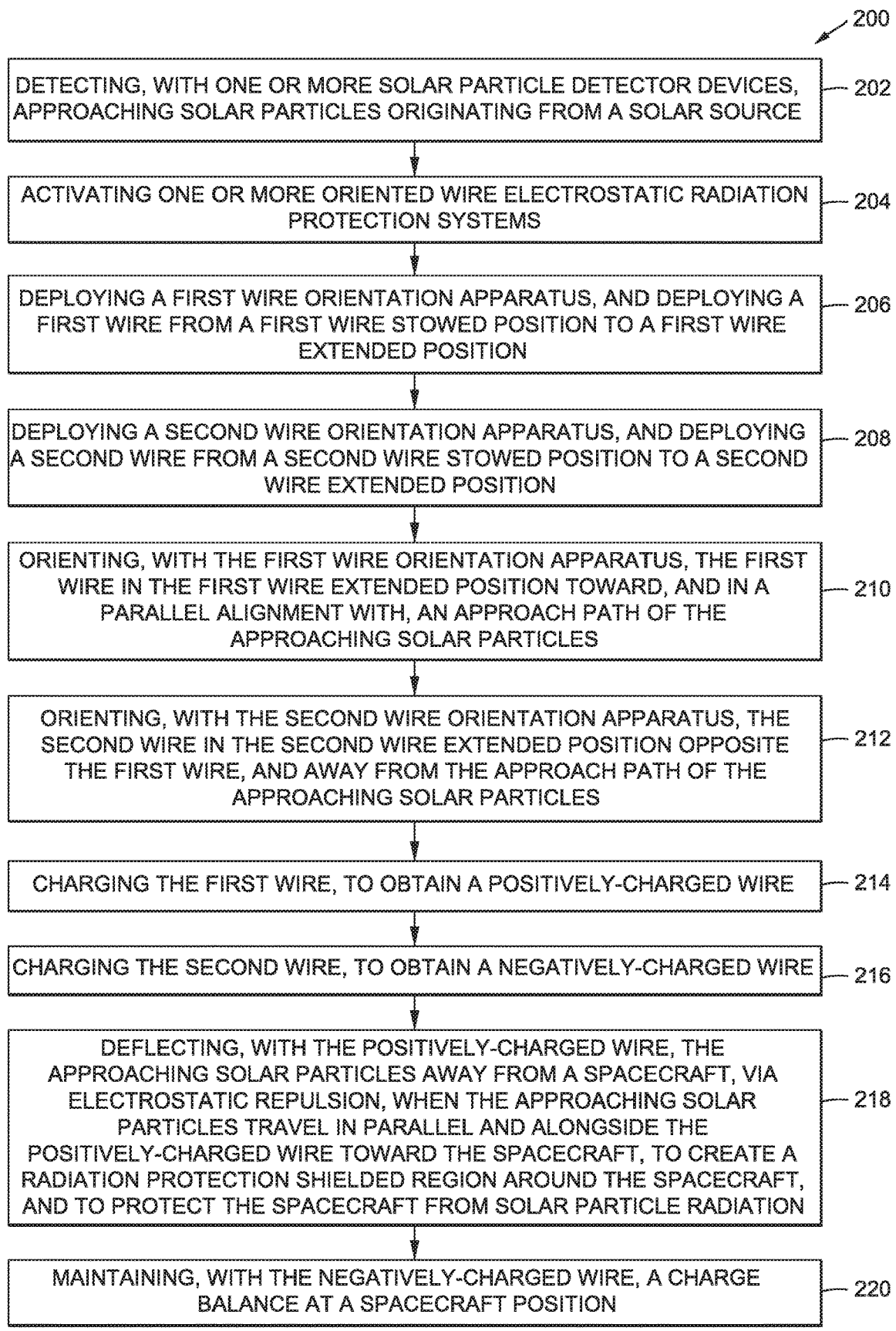
FIG. 6 is an illustration of a flowchart of steps of an exemplary version of a method of protecting a spacecraft from solar particle radiation using one or more oriented wire electrostatic radiation protection systems of the disclosure.

Referring now to FIG. 6, in another version there is provided a method 200 of protecting a spacecraft 12 (see FIG. 1) from solar particle radiation 26 (see FIG. 1) using one or more oriented wire electrostatic radiation protection systems 10 (see FIG. 1) of the disclosure. FIG. 6 is an illustration of a flowchart of steps of an exemplary version of the method 200 of protecting the spacecraft 12 from solar particle radiation 26 using the one or more oriented wire electrostatic radiation protection systems 10, discussed in detail above. In one version, the spacecraft 12 (see FIG. 1) comprises an interplanetary spacecraft 12a (see FIG. 1) configured to travel between planets 18 (see FIG. 1).

As shown in FIG. 6, the method 200 comprises step 202 of detecting, with one or more solar particle detector devices 50 (see FIGS. 1, 3A), solar particles 24 (see FIGS. 1, 2A), such as approaching solar particles 24a (see FIGS. 1, 2A, 3C) originating from a solar source 30 (see FIGS. 1, 2A) comprising one or more of, a solar wind 32 (see FIG. 1), a solar coronal mass ejection (CME) 36 (see FIGS. 1, 2A), such as associated with a solar flare 38 (see FIGS. 1, 2A), or another type of solar source 30. The one or more solar particle detector devices 50 (see FIG. 3A) may be coupled to the spacecraft 12 (see FIG. 3A), or the one or more solar particle detector devices 50 may be coupled to other spacecraft, satellites, telecommunications devices, or space or Earth-based stations, in communication with the spacecraft 12. In one version, for manned spacecraft 12b (see FIG. 1), the one or more solar particle detector devices 50 may comprise sensor devices and processing circuitry and/or antennas, for example, a charged particle detector, an optical detector, a detector of approaching particle direction or vector, a remote warning signal provided to a spacecraft protection system control from a different spacecraft, from a warning satellite or satellite array, or from Earth-based observers or automated warning system, or another suitable solar particle detector device 50. The one or more solar particle detector devices 50 detect the approaching solar particles 24a, such as in the form of solar particle radiation 26, to alert the spacecraft occupants 20, and to provide sufficient time to deploy or activate the oriented wire electrostatic radiation protection system 10 (see FIG. 1), before the approaching solar particles 24a reach a spacecraft position 52 (see FIG. 1) of the manned spacecraft 12b in space 16. In another version, for unmanned spacecraft 12c (see FIG. 1), the one or more solar particle detector devices 50 may comprise antennas or sensor devices, for example, a charged particle detector, an optical detector, a detector of approaching particle direction or vector, a remote warning signal provided to a spacecraft protection system control from a different spacecraft, from a warning satellite or satellite array, or from Earth-based observers or automated warning system, or another suitable solar particle detector device 50, to receive warnings of the approaching solar particles 24a, such as in the form of solar particle radiation 26, via Earth-based devices or other space-based devices in communication with the unmanned spacecraft 12c, and to provide sufficient time to deploy or activate the oriented wire electrostatic radiation protection system 10 (see FIG. 1), before the approaching solar particles 24a reach the spacecraft position 52 of the unmanned spacecraft 12c in space 16.

As shown in FIG. 6, the method 200 comprises step 204 of activating one or more oriented wire electrostatic radiation protection systems 10. Preferably, the one or more oriented wire electrostatic radiation protection systems 10 are coupled to the spacecraft 12. Each of the one or more oriented wire electrostatic radiation protection systems 10 comprises the wire management system 54 (see FIGS. 1, 3B) coupled to the spacecraft 12 (see FIGS. 1, 3B). The wire management system 54 (see FIGS. 1, 3B), as discussed in detail above, comprises one or more wire management assemblies 55 (see FIGS. 1, 3B, 3D), including the first wire management assembly 55a (see FIGS. 3A-3B) coupled to a portion 12d (see FIGS. 1, 3B) of the spacecraft 12 (see FIGS. 1, 3B), and the second wire management assembly 55b (see FIGS. 3A, 3D) coupled to the spacecraft 12 (see FIGS. 3A, 3B).

As discussed in detail above, each of the one or more oriented wire electrostatic radiation protection systems 10 further comprises a first wire 56 (see FIG. 1) coupled to the wire management system 54 (see FIG. 1), and a second wire 60 (see FIG. 1) coupled to the wire management system 54. As discussed above, the first wire 56, such as a positively-charged wire 56a (see FIG. 1), in the form of the multi-strand wire 64 (see FIG. 1), or cable, having the first end 57a (see FIG. 3C), the second end 57b (see FIG. 3C), and the length 58 (see FIG. 3C). The first end 57a of the first wire 56, such as the multi-strand wire 64, or cable, is attached to the wire management assembly 55 (see FIG. 3C), such as the first wire management assembly 55a (see FIG. 3C). As further discussed above, the second wire 60, such as the negatively-charged wire 60a (see FIGS. 1, 3D), in the form of the multi-strand wire 64 (see FIG. 1), or cable, having the first end 61a (see FIG. 3D), the second end 61b (see FIG. 3D), and the length 62 (see FIG. 3D). The first end 61a of the second wire 60, such as the multi-strand wire 64, or cable, is attached to the wire management assembly 55 (see FIG. 3D), such as the second wire management assembly 55b (see FIG. 3D).

Each of the one or more oriented wire electrostatic radiation protection systems 10 further comprises one or more wire orientation apparatuses 66 of the wire management system 54. The one or more wire orientation apparatuses 66 (see FIGS. 1, 3B, 3D) include the first wire orientation apparatus 66a (see FIGS. 1, 3B), such as in the form of first microsatellite 67a (see FIG. 3B), and the second wire orientation apparatus 66b (see FIGS. 1, 3D), such as in the form of second microsatellite 67b (see FIG. 3D). The second end 57b (see FIG. 3C) of the first wire 56 (see FIG. 3C) is attached to the first wire orientation apparatus 66a (see FIG. 3C), and the second end 61b (see FIG. 3D) of the second wire 60 (see FIG. 3D) is attached to the second wire orientation apparatus 66b (see FIG. 3D).

Each of the one or more oriented wire electrostatic radiation protection systems 10 further comprises one or more power supplies 68 (see FIG. 1), such as high voltage power supplies 68c (see FIG. 1). The one or more power supplies 68 may comprise one power supply 68 having the power supply first portion 68a (see FIGS. 1, 3C), such as the positive terminal 69a (see FIG. 1), coupled to the first wire 56 (see FIGS. 1, 3C), and having the power supply second portion 68b (see FIGS. 1, 3D), such as the negative terminal 69b (see FIG. 1), coupled to the second wire 60 (see FIGS. 1, 3D). The oriented wire electrostatic radiation protection system 10 further comprises one or more control systems 70 (see FIG. 1), to control operation of the oriented wire electrostatic radiation protection system 10. The one or more control systems 70 (see FIGS. 1, 3C, 3D) may comprise the first control system 70a (see FIG. 3C) and the second control system 70b (see FIG. 3D).

The step 204 (see FIG. 6) of activating the one or more oriented wire electrostatic radiation protection systems 10, may further comprise the oriented wire electrostatic radiation protection system 10 having the wire management system 54 further comprising, one or more wire management assemblies 55, such as the first wire management assembly 55a (see FIG. 3A) and the second wire management assembly 55b (see FIG. 3A). The wire management assembly 55 comprises a spooling apparatus 72 (see FIG. 1), such as in the form of spool 73 (see FIG. 1), to hold, deploy, and retract one of, the first wire 56, the second wire 60, or the first wire 56 and the second wire 60.

As discussed above, the first spooling apparatus 72a (see FIG. 3B) of the first wire management assembly 55a (see FIG. 3B) holds, or is configured to hold, the first wire 56 (see FIG. 3B) in the first wire stowed position 74 (see FIG. 3B), and assists in deploying the first wire 56, such as the multi-strand wire 64, or cable, from the first wire stowed position 74 (see FIGS. 1, 3B) to the first wire extended position 76 (see FIGS. 1, 3C), and retracts the first wire 56, such as the positively-charged wire 56a (see FIG. 3C), from the first wire extended position 76 (see FIG. 3C) to the first wire stowed position 74 (see FIG. 3B). As discussed above, the second spooling apparatus 72b (see FIG. 3D) of the second wire management assembly 55b (see FIG. 3D) holds, or is configured to hold, the second wire 60 (see FIG. 3A) in the second wire stowed position 75 (see FIG. 3A), and assists in deploying the second wire 60, such as the multi-strand wire 64, or cable, from the second wire stowed position 75 (see FIGS. 1, 3A) to the second wire extended position 77 (see FIGS. 1, 3D), and retracts the second wire 60, such as the negatively-charged wire 60a (see FIG. 3D), from the second wire extended position 77 (see FIG. 3D) to the second wire stowed position 75 (see FIG. 3A).

As discussed in detail above, the wire management assembly 55 further comprises the deployment apparatus 78 (see FIG. 1), such as the launch device 79 (see FIG. 1), coupled to the spooling apparatus 72. The deployment apparatus 78 (see FIG. 3B), such as the first deployment apparatus 78a (see FIG. 3B), of the first wire management assembly 55a (see FIG. 3B) deploys the first wire orientation apparatus 66a (see FIG. 3C) attached to the second end 57b (see FIG. 3C) of the first wire 56 (see FIG. 3B), and deploys the first wire 56, such as the multi-strand wire 64, or cable, from the first wire stowed position 74 (see FIG. 3B) to the first wire extended position 76 (see FIG. 3C). The deployment apparatus 78 (see FIG. 3D), such as the second deployment apparatus 78b (see FIG. 3B), of the second wire management assembly 55b (see FIG. 3D) deploys the second wire orientation apparatus 66b (see FIG. 3D) attached to the second end 61b (see FIG. 3D) of the second wire 60 (see FIG. 3D), and deploys the second wire 60, such as the multi-strand wire 64, or cable, from the second wire stowed position 75 (see FIG. 3A) to the second wire extended position 77 (see FIG. 3D).

As discussed in detail above, the wire management assembly 55 further comprises one or more motors 80 (see FIG. 1) coupled to the spooling apparatus 72, to drive the spooling apparatus 72. The first wire management assembly 55a (see FIG. 3B) comprises the first motor 80a (see FIG. 3B), and the second wire management assembly 55b (see FIG. 3D) comprises the second motor 80b (see FIG. 3B). The wire management assembly 55 further comprises the controller 82 (see FIG. 1) and the control interface 84 (see FIG. 1) of the control system 70 (see FIG. 1). The control interface 84 is coupled to the controller 82. The first wire management assembly 55a (see FIG. 3B) comprises the first control interface 84a (see FIG. 3B) coupled to the first controller 82a (see FIG. 3B), and the second wire management assembly 55b (see FIG. 3D) comprises the second control interface 84b (see FIG. 3D) coupled to the second controller 82b (see FIG. 3D). The controller 82 is coupled to the spooling apparatus 72, via the one or more motors 80, and is coupled to the deployment apparatus 78. The controller 82 preferably controls operation of the spooling apparatus 72, via the one or more motors 80, and preferably controls operation of the deployment apparatus 78.

The step 204 (see FIG. 6) of activating the one or more oriented wire electrostatic radiation protection systems 10, may further comprise the oriented wire electrostatic radiation protection system 10 comprising the wire orientation apparatus 66 (see FIG. 1), such as in the form of microsatellite 67 (see FIG. 1), where the wire orientation apparatus 66, such as in the form of microsatellite 67 has the guidance and positioning system 92 (see FIGS. 3C, 3D), and has the propulsion system 94 (see FIGS. 3C, 3D) with one or more ion thrusters 96 (see FIGS. 3C, 3D).

As further shown in FIG. 6, the method 200 comprises step 206 of deploying the first wire orientation apparatus 66a, which is attached to the second end 57b of the first wire 56, and deploying the first wire 56 from the first wire stowed position 74 to the first wire extended position 76. The wire management system 54 is used to deploy the first wire orientation apparatus 66a and the first wire 56 attached to the first wire orientation apparatus 66a.

As further shown in FIG. 6, the method 200 comprises step 208 of deploying the second wire orientation apparatus 66b, which is attached to the second end 61b of the second wire 60, and deploying the second wire 60 from the second wire stowed position 75 to the second wire extended position 77. The wire management system 54 is used to deploy the second wire orientation apparatus 66b and the second wire 60 attached to the second wire orientation apparatus 66b.

As further shown in FIG. 6, the method 200 comprises step 210 of orienting, with the wire orientation apparatus 66, such as the first wire orientation apparatus 66a (see FIG. 3B), in the form of first microsatellite 67a (see FIG. 3B), the first wire 56 (see FIG. 3C), such as the multi-strand wire 64, or cable, in the first wire extended position 76 (see FIG. 3C) in an orientation 98 (see FIG. 1), such as the first wire orientation 98a (see FIG. 3C), where the first wire 56, such as the multi-strand wire 64, or cable, is oriented in the direction 100 (see FIGS. 1, 3C), such as the first wire direction 100a (see FIGS. 1, 3C), toward, and in a parallel alignment 102 (see FIGS. 1, 3C) with, the approach path 28 (see FIGS. 1, 3C) of the approaching solar particles 24a (see FIGS. 1, 3C), such as protons 42 (see FIGS. 1, 3C). The step 210 (see FIG. 6) of orienting, with the first wire orientation apparatus 66a, the first wire 56, may further comprise maintaining the first wire orientation 98a of the first wire 56, at a predetermined distance 104 (see FIG. 1), such as a first wire predetermined distance 104a (see FIGS. 1, 3C), from the spacecraft 12, and may further comprise maintaining the tension 106 (see FIG. 1), such as a first wire tension 106a (see FIG. 1), of the first wire 56 in the first wire extended position 76.

As further shown in FIG. 6, the method 200 comprises step 212 of orienting, with the wire orientation apparatus 66, such as the second wire orientation apparatus 66b (see FIG. 3D), in the form of second microsatellite 67b (see FIG. 3D), the second wire 60 (see FIG. 3D), such as the multi-strand wire 64, or cable, in the second wire extended position 77 (see FIG. 3D) in an orientation 98 (see FIG. 1), such as the second wire orientation 98b (see FIG. 3D), where the second wire 60 is oriented in the direction 100 (see FIGS. 1, 3D), such as the second wire direction 100b (see FIGS. 1, 3D), opposite to the first wire direction 100a (see FIG. 3C), and away from the approach path 28 (see FIG. 3C) of the approaching solar particles 24a (see FIG. 3C), such as protons 42 (see FIG. 1), and away from the spacecraft 12 (see FIG. 3D). The step 212 (see FIG. 6) of orienting, with the second wire orientation apparatus 66b, the second wire 60, may further comprise maintaining the second wire orientation 98b of the second wire 60, at the predetermined distance 104 (see FIG. 1), such as the second wire predetermined distance 104b (see FIGS. 1, 3D), from the spacecraft 12 (see FIG. 3D), and may further comprise maintaining the tension 106 (see FIG. 1), such as the second wire tension 106b (see FIG. 1), of the second wire 60 in the second wire extended position 77 (see FIG. 3D).

As further shown in FIG. 6, the method 200 comprises step 214 of charging the first wire 56, such as in the form of the multi-strand wire 64, or cable, with the power supply first portion 68a (see FIG. 1), such as the positive terminal 69a (see FIG. 1), of the power supply 68 (see FIG. 3C), to obtain a positively-charged wire 56a (see FIGS. 1, 3C). The step 214 of charging the first wire 56 with the power supply first portion 68a may further comprise charging the first wire 56 with a high voltage power supply 68c (see FIG. 1), to obtain the positively-charged wire 56a, preferably charged to a range of from 4 MV (four megavolts) to 10 MV (ten megavolts), and more preferably, charged to a range of from 4 MV (four megavolts) to 5 MV (five megavolts).

As further shown in FIG. 6, the method 200 comprises step 216 of charging the second wire 60, such as in the form of the multi-strand wire 64, or cable, with the power supply second portion 68b (see FIG. 1), such as the negative terminal 69b (see FIG. 1), of the power supply 68 (see FIG. 3D) to obtain a negatively-charged wire 60a (see FIGS. 1, 3D). The step 216 of charging the second wire 60 with the power supply second portion 68b may further comprise charging the second wire 60 with a high voltage power supply 68c (see FIG. 1), to obtain the negative-charged wire 60a, preferably charged to a range of from 4 MV (four megavolts) to 10 MV (ten megavolts), and more preferably, charged to a range of from 4 MV (four megavolts) to 5 MV (five megavolts).

Alternatively, the power supply 68 may comprise a high voltage section, a high voltage insulation between an output terminal and the positively-charged wire 56a, and a second insulated terminal connecting to one or more negatively-charged wires 60a, or wire array, forming the negatively-charged wire 60a, or wires, in space 16. The negatively-charged wire 60a, or wires, allow(s) the spacecraft 12 to remain at ground voltage in relation to the voltage on the positively-charged wire 56a.

As further shown in FIG. 6, the method 200 comprises step 218 of deflecting, with the positively-charged wire 56a, the approaching solar particles 24a away from the spacecraft 12, via electrostatic repulsion 108 (see FIGS. 1, 3C), when the approaching solar particles 24a travel in parallel, or substantially in parallel, and alongside the positively-charged wire 56a toward the spacecraft 12, to create the radiation protection shielded region 110 (see FIGS. 1, 2B, 3C) around the spacecraft 12, and to protect the spacecraft 12 from the direct impact of solar particle radiation 26 (see FIGS. 1, 2B, 3C).

As further shown in FIG. 6, the method 200 comprises step 220 of maintaining, with the negatively-charged wire 60a, a charge balance 51 (see FIGS. 1, 2B) at a spacecraft position 52 (see FIGS. 1, 2B). The method 200 (see FIG. 6) may further comprise after the step 218 (see FIG. 6) of deflecting, with the positively-charged wire 56a, the approaching solar particles 24a away from the spacecraft 12, and after the step 220 (see FIG. 6) of maintaining, with the negatively-charged wire 60a, the charge balance 51, the steps of discharging the positively-charged wire 56a and discharging the negatively-charged wire 60a, and retracting, with the wire management system 54, the first wire 56 (see FIG. 3C) that has been discharged, from the first wire extended position 76 (see FIG. 3C) to the first wire stowed position 74 (see FIG. 3A), and retracting, with the wire management system 54, the second wire 60 (see FIG. 3D) that has been discharged, from the second wire extended position 77 (see FIG. 3D) to the second wire stowed position 75 (see FIG. 3A).

In another version, the method 200 (see FIG. 6) further comprises protecting a ground-based installation 13 (see FIG. 1) from solar particle radiation 26 (see FIG. 1) using one or more oriented wire electrostatic radiation protection systems 10 (see FIG. 1). The method 200 for further protecting the ground-based installation 13 comprises step 202 (see FIG. 6) of detecting, with one or more solar particle detector devices 50 (see FIG. 1), approaching solar particles 24a (see FIG. 1) originating from a solar source 30 (see FIG. 1) comprising one or more of, a solar wind 32 (see FIG. 1), and a solar coronal mass ejection (CME) 36 (see FIG. 1). The one or more solar particle detector devices 50 may comprise sensor devices and processing circuitry and/or antennas, for example, a charged particle detector, an optical detector, a detector of approaching particle direction or vector, a remote warning signal provided to a ground-based installation protection system control from a different spacecraft, from a warning satellite or satellite array, or from Earth-based observers or automated warning system, or another suitable solar particle detector device 50. The one or more solar particle detector devices 50 detect the approaching solar particles 24a, such as in the form of solar particle radiation 26, to alert the r ground-based installation occupants 21 (see FIG. 1), and to provide sufficient time to deploy or activate the oriented wire electrostatic radiation protection system 10 (see FIG. 1), before the approaching solar particles 24a reach a ground-based installation position of the manned ground-based installation 13. In another version, for unmanned ground-based installations 13, the one or more solar particle detector devices 50 may comprise antennas or sensor devices, for example, a charged particle detector, an optical detector, a detector of approaching particle direction or vector, a remote warning signal provided to a ground-based installation protection system control from a different spacecraft, from a warning satellite or satellite array, or from Earth-based observers or automated warning system, or another suitable solar particle detector device 50, to receive warnings of the approaching solar particles 24a, such as in the form of solar particle radiation 26, via Earth-based devices or other space-based devices in communication with the unmanned spacecraft 12c, and to provide sufficient time to deploy or activate the oriented wire electrostatic radiation protection system 10 (see FIG. 1), before the approaching solar particles 24a reach the ground-based installation position of the unmanned ground-based installation 13.

The method 200 for further protecting the ground-based installation 13 further comprises the step 204 (see FIG. 6) of activating one or more oriented wire electrostatic radiation protection systems 10. In this version for protecting the ground-based installation 13, each of the one or more oriented wire electrostatic radiation protection systems 10 comprises the wire management system 54 (see FIG. 1) coupled to the ground-based installation 13, where the wire management system 54 comprises the first wire orientation apparatus 66a (see FIG. 1). Each of the one or more oriented wire electrostatic radiation protection systems 10 for protecting the ground-based installation 13 further comprises a first wire 56 (see FIG. 1) coupled to the wire management system 54, a power supply 68 (see FIG. 1) having the power supply first portion 68a (see FIG. 1) coupled to the first wire 56, and the control system 70 (see FIG. 1), to control operation of the oriented wire electrostatic radiation protection system 10.

The method 200 for further protecting the ground-based installation 13 further comprises the step 206 (see FIG. 6) of deploying the first wire orientation apparatus 66a, and deploying the first wire 56 from the first wire stowed position 74 (see FIG. 1) to the first wire extended position 76 (see FIG. 1). The method 200 for further protecting the ground-based installation 13 further comprises the step 210 (see FIG. 6) of orienting, with the first wire orientation apparatus 66a, the first wire 56 in the first wire extended position 76 in the first wire orientation 98a (see FIG. 1), where the first wire 56 is oriented in the first wire direction 100a (see FIG. 1) toward, and in parallel alignment 102 (see FIG. 1) with, the approach path 28 (see FIG. 1) of the approaching solar particles 24a (see FIG. 1). The step 210 of orienting, with the first wire orientation apparatus 66a, the first wire 56, further comprises, maintaining the first wire orientation 98a of the first wire 56 at a first wire predetermined distance 104a (see FIG. 1) from the ground-based installation 13. The method 200 for further protecting the ground-based installation 13 further comprises the step 214 (see FIG. 6) of charging the first wire 56 with the power supply first portion 68a, to obtain the positively-charged wire 56a (see FIG. 1). The step 214 of charging the first wire 56 further comprises preferably charging the first wire 56 to a range of from 4 MV (four megavolts) to 10 MV (ten megavolts). The method 200 for further protecting the ground-based installation 13 further comprises the step of deflecting, with the positively-charged wire 56a, the approaching solar particles 24a away from the ground-based installation 13, via electrostatic repulsion 108 (see FIG. 1), when the approaching solar particles 24a travel in parallel and alongside the positively-charged wire 56a toward the ground-based installation 13, to create the radiation protection shielded region 110 (see FIG. 1) around the ground-based installation 13, and to protect the ground-based installation 13 from solar particle radiation 26 (see FIG. 1). The method 200 may further comprise after the step of deflecting, with the positively-charged wire 56a, the steps of discharging the positively-charged wire 56a, and retracting the first wire 56 from the first wire extended position 76 to the first wire stowed position 74.

In the method 200 for further protecting the ground-based installation 13, the one or more oriented wire electrostatic radiation protection systems 10 may optionally include a second wire 60 (see FIG. 1) coupled to the wire management system 54, where the wire management system 54 comprises a second wire orientation apparatus 66b (see FIG. 1), and may optionally include a power supply second portion 68b (see FIG. 1) coupled to the second wire 60. The method 200 for further protecting the ground-based installation 13 may further include the step 208 (see FIG. 6) of deploying the second wire orientation apparatus 66b, and deploying the second wire 60 from the second wire stowed position 75 (see FIG. 1) to the second wire extended position 77 (see FIG. 1). The method 200 for further protecting the ground-based installation 13 may further include the step 212 (see FIG. 6), if the second wire 60 is used, of orienting, with the second wire orientation apparatus 66b, the second wire 60 in the second wire extended position 77 in a second wire orientation 98b (see FIG. 1), where the second wire 60 is oriented in a second wire direction 100b (see FIG. 1), opposite to the first wire direction 100a, and away from the approach path 28 of the approaching solar particles 24a. The step 212 of orienting, with the second wire orientation apparatus 66b, the second wire 60, may further include, maintaining the second wire orientation 98b of the second wire 60 at a second wire predetermined distance 104b (see FIG. 1) from the ground-based installation 13, if the second wire 60 is used.

The method 200 for further protecting the ground-based installation 13 may further include the step 216 (see FIG. 6) of charging the second wire 60 with the power supply second portion 68b, to obtain the negatively-charged wire 60a (see FIG. 1), if the second wire 60 is used. The step 216 of charging the second wire 60 may further include charging the second wire 60 preferably to a range of from 4 MV (four megavolts) to 10 MV (ten megavolts), if the second wire 60 is used. The method 200 for further protecting the ground-based installation 13 may further include the step 220 (see FIG. 6) of maintaining, with the negatively-charged wire 60a, a charge balance 51 (see FIG. 1) at the ground-based installation position, if the second wire 60 is used. The method 200 for further protecting the ground-based installation 13 may further include after the step 220 of maintaining, with the negatively-charged wire 60a, the steps of discharging the negatively-charged wire 60a, and retracting the second wire 60 from the second wire extended position 77 to the second wire stowed position 75.

The wire management system 54 of each oriented wire electrostatic radiation protection system 10 preferably has one or more wire management assemblies 55 (see FIG. 1), where each of the one or more wire management assemblies 55 comprise a spooling apparatus 72 (see FIG. 1) to hold, deploy, and retract the first wire 56, the second wire 60, if the second wire 60 is used, or the first wire 56 and the second wire 60, if the second wire 60 is used; a deployment apparatus 78 (see FIG. 1) coupled to the spooling apparatus 72; one or more motors 80 (see FIG. 1) coupled to the spooling apparatus 72 to drive the spooling apparatus 72; and a controller 82 (see FIG. 1) and a control interface 84 (see FIG. 1) of the control system 70. The control interface 84 is coupled to the controller 82, and the controller 82 is coupled to the spooling apparatus 72, via the one or more motors 80, and is coupled to the deployment apparatus 78. The controller 82 controls operation of the spooling apparatus 72 and the deployment apparatus 78.

Disclosed versions of the oriented wire electrostatic radiation protection system 10 (see FIGS. 1-3C), the spacecraft 12 (see FIGS. 1-3C) having one or more oriented wire electrostatic radiation protection systems 10, and the method 200 (see FIG. 6) of protecting a spacecraft 12 from solar particle radiation 26 (see FIG. 1) using the one or more oriented wire electrostatic radiation protection systems 10, provide effective protection for spacecraft occupants 20 (see FIGS. 1, 3A) and spacecraft equipment 22 (see FIGS. 1, 3A) of interplanetary spacecraft 12a, for example, spacecraft 12 traveling between Earth 18a (see FIG. 1) and Mars 18b (see FIG. 1), or other planets 18 (see FIG. 1), by using electrostatic repulsion 108 (see FIG. 1) of positively-charged protons 42a (see FIG. 1) from the vicinity of the positively-charged wire 56a (see FIG. 1). If the first wire 56 (see FIG. 1), such as the multi-strand wire 64 (see FIG. 1), or cable, is sufficiently long and charged, it creates a radiation protection shielded region 110 (see FIGS. 1, 2B, 3C), or protected zone, sufficient to protect the entire spacecraft 12, at much lower mass and burden than known passive barriers. The first wire 56, such as the positively-charged wire 56a, may be extended from the spacecraft 12 and maintained in the correct pointing direction, such as the first wire direction 100a (see FIG. 1), toward approaching solar particles 24a (see FIG. 1), such as protons 42 (see FIG. 1), from the solar source 30 (see FIG. 1), such as a solar wind 32 (see FIG. 1), or a solar particle event 34 (see FIG. 1), for example, a solar coronal mass ejection (CME) 36 (see FIGS. 1, 2A) by one or more wire orientation apparatuses 66, such as microsatellites 67 (see FIG. 1), for example, small, maneuvering end-point microsatellites each equipped with ion thrusters 96 (see FIGS. 3B-3D), or the like, and a guidance and positioning system 92 (see FIGS. 3B-3D), to maneuver, hold the orientation 98, or position, of the first wire 56 and the second wire 60, and to control the tension 106 (see FIG. 1) of the first wire 56 and the second wire 60.

In addition, disclosed versions of the oriented wire electrostatic radiation protection system 10 (see FIGS. 1-3C), the spacecraft 12 (see FIGS. 1-3C) having one or more oriented wire electrostatic radiation protection systems 10, and the method 200 (see FIG. 6) of protecting the spacecraft 12 from solar particle radiation 26 (see FIG. 1) using the one or more oriented wire electrostatic radiation protection systems 10, provide a low mass, low power, low cost, and low burden protection to the spacecraft 12, spacecraft occupants 20, and spacecraft equipment 22, against solar particle radiation 26 (see FIGS. 1, 2B, 3C) from solar wind 32, or solar CMEs 36, which are randomly occurring, by deployment of a long, thin, first wire 56 (see FIGS. 2A, 3C) pointing in the first wire direction 100a (see FIGS. 2B, 3C) of, and oriented toward, the approach path 28 of approaching solar particles 24a, such as protons 42 from the solar wind 32 or solar CME 36, and by deployment of a long, thin, second wire 60 (see FIGS. 2A, 3D) pointing in the second wire direction 100b (see FIGS. 2B, 3D) opposite to the first wire direction 100a. The first wire 56, such as the positively-charged wire 56a (see FIG. 1), charged to repel the protons 42 (see FIGS. 1, 3C) as they travel alongside the positively-charged wire 56a on their way to the spacecraft 12. The first wire 56, such as the positively-charged wire 56a, repels the protons 42 with electrostatic repulsion 108 (see FIGS. 1, 3C), and the integrated force of the electrostatic repulsion 108 deflects the protons 42, such as high energy protons, and creates a protected region, such as the radiation protection shielded region 110 (see FIGS. 1, 2B, 3C), that may be, for example, 100 m (one hundred meters), in diameter, or another suitable size diameter, around the spacecraft 12, at the spacecraft position 52 (see FIGS. 1, 2B) without requiring an extremely high charging voltage. The use of time-integrated lateral thrust 112 (see FIG. 1), or force, on the approaching solar particles 24a (see FIG. 1) allows the use of moderate high voltage to provide effective protection of a large region around the spacecraft 12.

The power supply first portion 68a, such as the positive terminal 69a (see FIG. 1), of the power supply 68, is coupled to the first wire 56, to charge the first wire 56, to obtain an approximately cylindrical, or radially symmetric, charged region around the first wire 56. When approaching solar particles 24a travel in parallel, or substantially in parallel, and alongside the positively-charged wire 56a, that is, travel within the charged region, toward the spacecraft 12, the positively-charged wire 56a deflects the approaching solar particles 24a away from the spacecraft 12, via electrostatic repulsion 108, and by so doing, the positively-charged wire 56a creates a region around the spacecraft 12 which is substantially shielded from exposure to solar particle radiation 26 (see FIGS. 1, 2B). Thus, the use of bulky and heavy physical shielding around the spacecraft 12 is avoided, the use by spacecraft occupants 20 of a small capsule or refuge inside the fuel or water tanks in the spacecraft 12 during the solar wind 32 or solar CME 36 is avoided, and normal operation of the spacecraft 12 during the solar wind 32 or solar CME 36 may be maintained.

Moreover, disclosed versions of the oriented wire electrostatic radiation protection system 10 (see FIGS. 1-3C), the spacecraft 12 (see FIGS. 1-3C) having one or more oriented wire electrostatic radiation protection systems 10, and the method 200 (see FIG. 6) of protecting the spacecraft 12 from solar particle radiation 26 (see FIG. 1) using one or more oriented wire electrostatic radiation protection systems 10, provide one or more positively-charged wires 56a that create a time integrated thrust as solar particles 24, such as protons 42, travel in a parallel alignment 102, or substantially parallel alignment, with the positively-charged wire 56a. The protons 42 that would impact the spacecraft 12 preferably diverge, to create new, divergent direction paths 29 (see FIGS. 2A, 3C), thus creating the radiation protection shielded region 110. The first wire 56, such as the positively-charged wire 56a (see FIGS. 1, 2B) functions as the protection electrode 56b (see FIG. 1). The second wire 60, such as the negatively-charged wire 60a (see FIGS. 1, 3D) functions as the counter-electrode 60b (see FIG. 1) to maintain the charge balance 51 (see FIGS. 1, 2B) of charge around the spacecraft 12. Further, the oriented wire electrostatic radiation protection system 10 (see FIGS. 1-3C) orients the one or more first wires 56 (see FIG. 2B), such as the one or more positively-charged wires 56a, parallel to, or substantially parallel to, and not perpendicular to, the approaching solar particles 24a (see FIG. 2B), and the one or more first wires 56 (see FIG. 2B), such as the one or more positively-charged wires 56a, are designed to provide protection or shielding of the spacecraft 12 (see FIG. 2B) against solar particle radiation 26 (see FIGS. 1, 2B), rather than thrust to the spacecraft 12.

Many modifications and other versions or embodiments of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation.

What is claimed is:

1. An oriented wire electrostatic radiation protection system for a spacecraft, the oriented wire electrostatic radiation protection system comprising:

a wire management system operable to couple to the spacecraft, the wire management system comprising a first wire orientation apparatus and a second wire orientation apparatus;

a first wire coupled to the wire management system, the wire management system deploying the first wire from a first wire stowed position to a first wire extended position, and the first wire orientation apparatus orienting the first wire in the first wire extended position in a first wire orientation, where the first wire is oriented in a first wire direction toward, and in a parallel alignment with, an approach path of approaching solar particles;

a second wire coupled to the wire management system, the wire management system deploying the second wire from a second wire stowed position to a second wire extended position, and the second wire orientation apparatus orienting the second wire in the second wire extended position in a second wire orientation, where the second wire is oriented in a second wire direction opposite to the first wire direction and away from the approach path of the approaching solar particles;

a power supply having a power supply first portion coupled to the first wire, the power supply first portion charging the first wire, to obtain a positively-charged wire, and the power supply having a power supply second portion coupled to the second wire, the power supply second portion charging the second wire, to obtain a negatively-charged wire; and a control system controlling operation of the oriented wire electrostatic radiation protection system, wherein, when the approaching solar particles travel in parallel and alongside the positively-charged wire toward the spacecraft, the positively-charged wire deflects the approaching solar particles away from the spacecraft, via electrostatic repulsion, and the positively-charged wire creates a radiation protection shielded region around the spacecraft, and the negatively-charged wire maintains a charge balance at a spacecraft position.

2. The oriented wire electrostatic radiation protection system of claim 1, wherein the wire management system further comprises one or more wire management assemblies, the wire management assembly comprising:

a spooling apparatus;

a deployment apparatus coupled to the spooling apparatus;

one or more motors coupled to the spooling apparatus, to drive the spooling apparatus; and a controller and a control interface of the control system, the control interface coupled to the controller, and the controller coupled to the spooling apparatus, via the one or more motors, and coupled to the deployment apparatus, the controller controlling operation of the spooling apparatus and the deployment apparatus.

3. The oriented wire electrostatic radiation protection system of claim 1, wherein the first wire and the second wire comprise a multi-strand wire having a plurality of bonded portions.

4. The oriented wire electrostatic radiation protection system of claim 1, wherein the first wire and the second wire are comprised of one or more conductive metal materials.

5. The oriented wire electrostatic radiation protection system of claim 1, wherein a length of the first wire is in a range of from 1000 meters to 5000 meters, and further wherein a length of the second wire is in a range of from 1000 meters to 5000 meters.

6. The oriented wire electrostatic radiation protection system of claim 1, wherein a diameter of the first wire is in a range of from 0.5 millimeters to 2.0 millimeters, and further wherein a diameter of the second wire is in a range of from 0.5 millimeters to 2.0 millimeters.

7. The oriented wire electrostatic radiation protection system of claim 1, wherein the first wire orientation apparatus and the second wire orientation apparatus comprise a microsatellite having a guidance and positioning system, and having a propulsion system with one or more ion thrusters.

8. The oriented wire electrostatic radiation protection system of claim 1, wherein the first wire orientation apparatus further maintains the first wire orientation of the first wire at a first wire predetermined distance from the spacecraft, and wherein the second wire orientation apparatus further maintains the second wire orientation of the second wire at a second wire predetermined distance from the spacecraft.

9. The oriented wire electrostatic radiation protection system of claim 1, wherein the approaching solar particles originate from a solar source comprising one or more of, a solar wind, and a solar coronal mass ejection (CME).

10. A spacecraft for interplanetary space travel, the spacecraft comprising:
one or more solar particle detector devices coupled to the spacecraft, the one or more solar particle detector devices detecting approaching solar particles originating from a solar source comprising one or more of, a solar wind, and a solar coronal mass ejection (CME);
one or more oriented wire electrostatic radiation protection systems coupled to the spacecraft, the one or more oriented wire electrostatic radiation protection systems comprising:
a wire management system comprising a first wire orientation apparatus and a second wire orientation apparatus;
a first wire coupled to the wire management system, the wire management system deploying the first wire from a first wire stowed position to a first wire extended position, and the first wire orientation apparatus orienting the first wire in the first wire extended position in a first wire orientation, where the first wire is oriented in a first wire direction toward, and in a parallel alignment with, an approach path of approaching solar particles, the first wire orientation apparatus further maintaining the first wire orientation of the first wire at a first wire predetermined distance from the spacecraft;
a second wire coupled to the wire management system, the wire management system deploying the second wire from a second wire stowed position to a second wire extended position, and the second wire orientation apparatus orienting the second wire in the second wire extended position in a second wire orientation, where the second wire is oriented in a second wire direction, opposite to the first wire direction, and away from the approach path of the approaching solar particles, the second wire orientation apparatus further maintaining the second wire orientation of the second wire at a second wire predetermined distance from the spacecraft;
a power supply having a power supply first portion coupled to the first wire, the power supply first portion charging the first wire, to obtain a positively-charged wire, and the power supply having a power supply second portion coupled to the second wire, the power supply second portion charging the second wire, to obtain a negatively-charged wire; and
a control system, to control operation of the one or more oriented wire electrostatic radiation protection systems,
wherein, when the approaching solar particles travel in parallel and alongside the positively-charged wire toward the spacecraft, the positively-charged wire deflects the approaching solar particles away from the spacecraft, via electrostatic repulsion, and the positively-charged wire creates a radiation protection shielded region around the spacecraft, to protect any spacecraft occupants and spacecraft equipment from solar particle radiation, and the negatively-charged wire maintains a charge balance at a spacecraft position.

11. The spacecraft of claim 10, wherein the wire management system further comprises one or more wire management assemblies, the wire management assembly comprising:
a spooling apparatus;
a deployment apparatus coupled to the spooling apparatus;
one or more motors coupled to the spooling apparatus to drive the spooling apparatus; and
a controller and a control interface of the control system, the control interface coupled to the controller, and the controller coupled to the spooling apparatus, via the one or more motors, and coupled to the deployment apparatus, the controller controlling operation of the spooling apparatus and the deployment apparatus.

12. The spacecraft of claim 10, wherein the first wire and the second wire comprise a multi-strand wire having a plurality of bonded portions, and further wherein the first wire and the second wire are comprised of one or more conductive metal materials.

13. The spacecraft of claim 10, wherein a length of the first wire is in a range of from 1000 meters to 5000 meters, and further wherein a length of the second wire is in a range of from 1000 meters to 5000 meters.

14. The spacecraft of claim 10, wherein the first wire orientation apparatus and the second wire orientation apparatus comprise a microsatellite having a guidance and positioning system, and having a propulsion system with one or more ion thrusters.

15. A method of protecting a spacecraft from solar particle radiation using one or more oriented wire electrostatic radiation protection systems, the method comprising the steps of:
detecting, with one or more solar particle detector devices, approaching solar particles originating from a solar source comprising one or more of, a solar wind, and a solar coronal mass ejection (CME);

activating one or more oriented wire electrostatic radiation protection systems, each of the one or more oriented wire electrostatic radiation protection systems comprising:
- a wire management system coupled to the spacecraft, the wire management system comprising a first wire orientation apparatus and a second wire orientation apparatus;
- a first wire coupled to the wire management system;
- a second wire coupled to the wire management system;
- a power supply having a power supply first portion coupled to the first wire, and having a power supply second portion coupled to the second wire; and
- a control system, to control operation of the oriented wire electrostatic radiation protection system;

deploying the first wire orientation apparatus, and deploying the first wire from a first wire stowed position to a first wire extended position;

deploying the second wire orientation apparatus, and deploying the second wire from a second wire stowed position to a second wire extended position;

orienting, with the first wire orientation apparatus, the first wire in the first wire extended position in a first wire orientation, where the first wire is oriented in a first wire direction toward, and in a parallel alignment with, an approach path of the approaching solar particles;

orienting, with the second wire orientation apparatus, the second wire in the second wire extended position in a second wire orientation, where the second wire is oriented in a second wire direction, opposite to the first wire direction, and away from the approach path of the approaching solar particles;

charging the first wire with the power supply first portion, to obtain a positively-charged wire;

charging the second wire with the power supply second portion, to obtain a negatively-charged wire;

deflecting, with the positively-charged wire, the approaching solar particles away from the spacecraft, via electrostatic repulsion, when the approaching solar particles travel in parallel and alongside the positively-charged wire toward the spacecraft, to create a radiation protection shielded region around the spacecraft, and to protect the spacecraft from solar particle radiation; and maintaining, with the negatively-charged wire, a charge balance at a spacecraft position.

16. The method of claim 15, further comprising after deflecting, with the positively-charged wire, and maintaining, with the negatively-charged wire, discharging the positively-charged wire and discharging the negatively-charged wire, and retracting the first wire from the first wire extended position to the first wire stowed position, and retracting the second wire from the second wire extended position to the second wire stowed position.

17. The method of claim 15, wherein activating the one or more oriented wire electrostatic radiation protection systems, further comprises the wire management system having one or more wire management assemblies, each of the one or more wire management assemblies comprising:
- a spooling apparatus to hold, deploy, and retract one of, the first wire, the second wire, or the first wire and the second wire;
- a deployment apparatus coupled to the spooling apparatus;
- one or more motors coupled to the spooling apparatus to drive the spooling apparatus; and
- a controller and a control interface of the control system, the control interface coupled to the controller, and the controller coupled to the spooling apparatus, via the one or more motors, and coupled to the deployment apparatus, the controller controlling operation of the spooling apparatus and the deployment apparatus.

18. The method of claim 15, wherein orienting, with the first wire orientation apparatus, the first wire, further comprises, maintaining the first wire orientation of the first wire at a first wire predetermined distance from the spacecraft.

19. The method of claim 15, wherein orienting, with the second wire orientation apparatus, the second wire, further comprises, maintaining the second wire orientation of the second wire at a second wire predetermined distance from the spacecraft.

20. The method of claim 15, wherein charging the first wire further comprises charging the first wire to a range of from 4 MV (four megavolts) to 10 MV (ten megavolts), and wherein charging the second wire further comprises charging the second wire to a range of from 4 MV (four megavolts) to 10 MV (ten megavolts).

* * * * *